(12) United States Patent
Kodama

(10) Patent No.: US 12,483,802 B2
(45) Date of Patent: Nov. 25, 2025

(54) IMAGING DEVICE AND IMAGING METHOD

(71) Applicant: SONY GROUP CORPORATION, Tokyo (JP)

(72) Inventor: Kazutoshi Kodama, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 243 days.

(21) Appl. No.: 18/003,399

(22) PCT Filed: Jun. 22, 2021

(86) PCT No.: PCT/JP2021/023591
§ 371 (c)(1),
(2) Date: Dec. 27, 2022

(87) PCT Pub. No.: WO2022/009664
PCT Pub. Date: Jan. 13, 2022

(65) Prior Publication Data
US 2023/0276141 A1  Aug. 31, 2023

(30) Foreign Application Priority Data
Jul. 9, 2020 (JP) .................................. 2020-118556

(51) Int. Cl.
H04N 25/47  (2023.01)
H04N 25/76  (2023.01)
H04N 25/78  (2023.01)

(52) U.S. Cl.
CPC ......... *H04N 25/47* (2023.01); *H04N 25/7795* (2023.01); *H04N 25/78* (2023.01)

(58) Field of Classification Search
CPC .... H04N 25/47; H04N 25/7795; H04N 25/78; H04N 23/60
See application file for complete search history.

(56) References Cited

U.S. PATENT DOCUMENTS

| | | | |
|---|---|---|---|
| 2014/0267716 A1* | 9/2014 | Child | H04N 7/186 348/143 |
| 2018/0167575 A1* | 6/2018 | Watanabe | H04N 25/78 |
| 2022/0132054 A1* | 4/2022 | Zhu | H04N 25/702 |

FOREIGN PATENT DOCUMENTS

| | | |
|---|---|---|
| CN | 110226325 A | 9/2019 |
| CN | 110546945 A | 12/2019 |

(Continued)

OTHER PUBLICATIONS

International Search Report and Written Opinion of PCT Application No. PCT/JP2021/023591, issued on Sep. 14, 2021, 08 pages of ISRWO.

*Primary Examiner* — Nhan T Tran
(74) *Attorney, Agent, or Firm* — CHIP LAW GROUP

(57) ABSTRACT

The present disclosure provides an imaging device and an imaging method capable of generating a DVS image and a gradation image at a higher speed.
An imaging device includes: a pixel array unit including a plurality of DVS pixels that outputs a first luminance signal corresponding to a light amount and a plurality of gradation pixels that outputs a second luminance signal corresponding to the light amount; a detection circuit that outputs a detection signal indicating occurrence of an address event in a case where a first luminance signal of each of the plurality of DVS pixels exceeds a predetermined threshold; a first reading unit that reads the first luminance signal from the plurality of DVS pixels and converts the first luminance signal into digital data; a second reading unit that reads the second luminance signal from the plurality of gradation pixels and converts the second luminance signal into digital data; and a control circuit that controls the first reading unit and the second reading unit.

15 Claims, 22 Drawing Sheets

(56) References Cited

FOREIGN PATENT DOCUMENTS

| JP | 2020068483 A | | 4/2020 | |
|---|---|---|---|---|
| JP | 2020072317 A | * | 5/2020 | ............ H04N 25/46 |
| JP | 2020-088722 A | | 6/2020 | |
| WO | 2017/013806 A1 | | 1/2017 | |
| WO | 2019/087471 A1 | | 5/2019 | |
| WO | WO-2019135411 A1 | | 7/2019 | |

* cited by examiner

IMAGING DEVICE AND IMAGING METHOD

CROSS REFERENCE TO RELATED APPLICATIONS

This application is a U.S. National Phase of International Patent Application No. PCT/JP2021/023591 filed on Jun. 22, 2021, which claims priority benefit of Japanese Patent Application No. JP 2020-118556 filed in the Japan Patent Office on Jul. 9, 2020. Each of the above-referenced applications is hereby incorporated herein by reference in its entirety.

TECHNICAL FIELD

The present disclosure relates to an imaging device and an imaging method.

BACKGROUND ART

A synchronous solid-state imaging element that captures image data (frames) in synchronization with a synchronization signal such as a vertical synchronization signal is used in an imaging device or the like. In this general synchronous solid-state imaging element, image data can be acquired only in each cycle (for example, 1/60 seconds) of a synchronization signal. Therefore, in fields related to traffic, robots, and the like, it is difficult to cope with a case where faster processing is required. Therefore, an asynchronous solid-state imaging element has been proposed in which a detection circuit that detects, for each pixel address, that the light amount of the pixel exceeds a threshold as an address event in real time is provided for each pixel. As described above, the solid-state imaging element that detects an address event for each pixel is called a dynamic vision sensor (DVS). It is possible to generate and output data at a much higher speed than a synchronous solid-state imaging element. For this reason, for example, in the traffic field, it is possible to improve safety by executing processing of recognizing an image of a person or an obstacle at high speed.

CITATION LIST

Patent Document

Patent Document 1: WO2019/087471 A

SUMMARY OF THE INVENTION

Problems to be Solved by the Invention

On the other hand, it may be required to display a higher-definition image than a DVS image based on a detection signal generated by a DVS pixel. However, while a DVS image is being read, a high-definition gradation image cannot be read, and generation of a high-definition gradation image may be delayed.

Therefore, the present disclosure provides an imaging device and an imaging method capable of generating a DVS image and a gradation image at a higher speed.

Solutions to Problems

In order to solve the above problem, according to the present disclosure, there is provided an imaging device including:

a pixel array unit including a plurality of DVS pixels that outputs a first luminance signal corresponding to a light amount and a plurality of gradation pixels that outputs a second luminance signal corresponding to the light amount;

a detection circuit that outputs a detection signal indicating occurrence of an address event in a case where a first luminance signal of each of the plurality of DVS pixels exceeds a predetermined threshold;

a first reading unit that reads the first luminance signal from the plurality of DVS pixels and converts the first luminance signal into digital data;

a second reading unit that reads the second luminance signal from the plurality of gradation pixels and converts the second luminance signal into digital data; and a control circuit that controls the first reading unit and the second reading unit.

The control circuit may simultaneously perform reading of the first luminance signal by the first reading unit and reading of the second luminance signal by the second reading unit.

In a case where occurrence of the address event is detected by the detection circuit, the control circuit may perform control to read the first luminance signal from the DVS pixel in which the address event is detected.

A time stamp generation circuit that generates a time stamp may be further provided, and
the control circuit may synchronize reading of the first luminance signal by the first reading unit with reading of the second luminance signal by the second reading unit by the time stamp.

Information of the time stamp may be added to DVS image data based on the first luminance signal read out from the first reading unit.

The information of the time stamp may be added to image data based on the luminance signal read out from the second reading unit.

The plurality of DVS pixels may be arranged in a two-dimensional array, and output signals from the plurality of DVS pixels may be read out according to an arrangement of rows of the array.

The control circuit may synchronize a reading cycle of the first luminance signal by the first reading unit with a reading cycle of the second luminance signal by the second reading unit.

The control circuit may generate a read synchronization signal of the second luminance signal by the second reading unit on the basis of a read synchronization signal of the first luminance signal by the first reading unit.

An arbitration circuit that arbitrates reading of luminance signals from the plurality of DVS pixels on the basis of the detection signal may be further provided, and
the control circuit may read the first luminance signal by the first reading unit according to arbitration by the arbitration circuit.

The plurality of DVS pixels may be arranged in a two-dimensional array,
the control circuit may synchronize a reading cycle of the first luminance signal by the first reading unit with a reading cycle of the second luminance signal by the second reading unit, and
the first luminance signal of each of the plurality of DVS pixels may be read out according to an arrangement of rows of the array.

The first luminance signal may be read out from all of the plurality of DVS pixels in synchronization with a reading cycle of the first luminance signal.

The pixel array unit may further include a plurality of gradation pixels for gradation, and
generation of a DVS image based on output signals of the plurality of DVS pixels, and
a gradation image based on output signals of the plurality of gradation pixels may be possible.

The control circuit may synchronize a reading cycle of the first luminance signal by the first reading unit with a reading cycle of the second luminance signal by the second reading unit.

The control circuit may generate a read synchronization signal of the second luminance signal by the second reading unit on the basis of a read synchronization signal of the first luminance signal by the first reading unit.

A data format of DVS image data based on the first luminance signal may be changed according to the number of occurrences of the address event.

A region of the plurality of gradation pixels may be divided into a plurality of regions, and
the second reading unit may read the second luminance signal for each of the plurality of regions.

According to the present disclosure, there is provided a method of controlling an imaging device including: a pixel array unit including a plurality of DVS pixels that outputs a first luminance signal corresponding to a light amount and a plurality of gradation pixels that outputs a second luminance signal corresponding to the light amount; and a detection circuit that outputs a detection signal indicating occurrence of an address event in a case where a first luminance signal of each of the plurality of DVS pixels exceeds a predetermined threshold, the method including:
simultaneously reading the first luminance signal and the second luminance signal according to occurrence of occurrence of the dress event.

MODE FOR CARRYING OUT THE INVENTION

Hereinafter, embodiments of an imaging device and an imaging method will be described with reference to the drawings. Although main components of the imaging device will be mainly described below, the imaging device may have components and functions that are not illustrated or described. The following description does not exclude components and functions that are not illustrated or described.

First Embodiment

[Configuration Example of Imaging Device]

Figure 1:
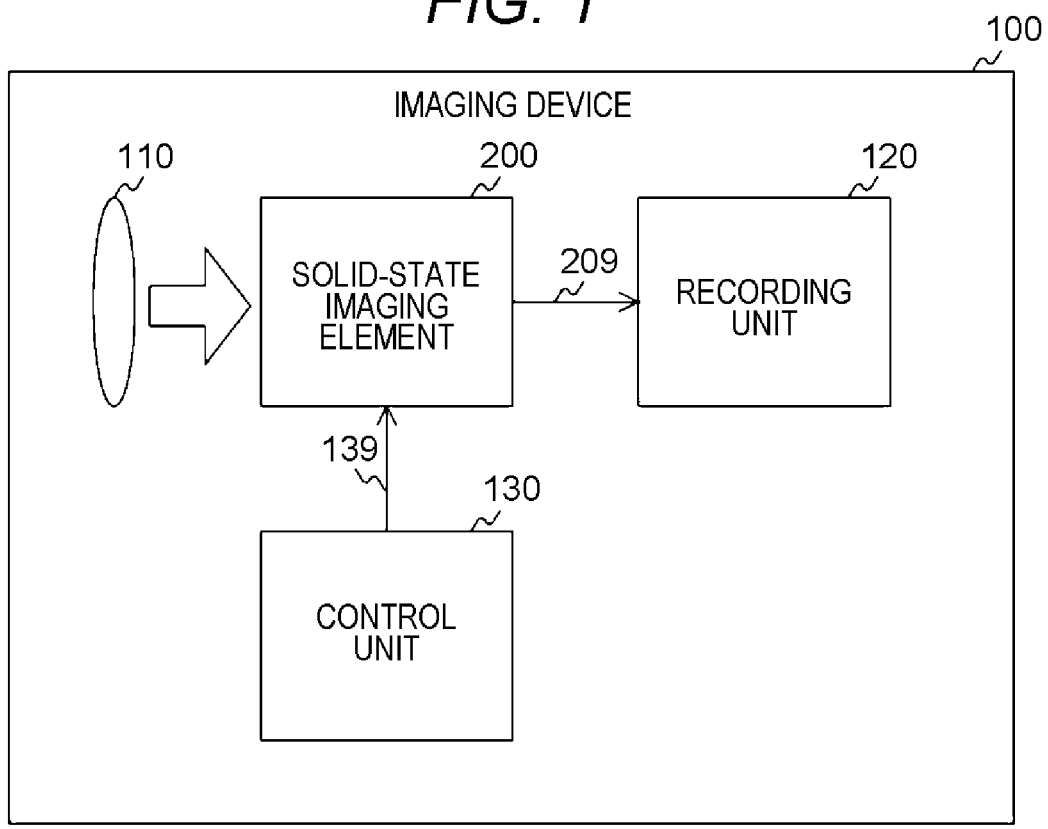
FIG. 1 is a block diagram illustrating an example of a configuration of an image device to which a technology according to the present disclosure is applied.

FIG. 1 is a block diagram illustrating a configuration example of an imaging device 100 according to an embodiment of the present technology. The imaging device 100 includes an imaging lens 110, a solid-state imaging element 200, a recording unit 120, and a control unit 130. As the imaging device 100, a camera mounted on a wearable device, an in-vehicle camera, or the like is assumed.

The imaging lens 110 condenses incident light and guides the light to the solid-state imaging element 200. The solid-state imaging element 200 includes a DVS pixel and a gradation pixel. The DVS pixel can detect that the absolute value of the luminance change amount exceeds a threshold as an address event. The address event includes, for example, an on-event indicating that the amount of increase in luminance exceeds the upper limit threshold and an off-event indicating that the amount of decrease in luminance falls below the lower limit threshold less than the upper limit threshold. Then, the solid-state imaging element 200 generates a detection signal indicating the detection result of the address event for each DVS pixel. Each of the detection signals includes an on-event detection signal VCH indicating presence or absence of an on-event and an off-event detection signal VCL indicating presence or absence of an off-event. Note that, although the solid-state imaging element 200 detects the presence or absence of both the on-event and the off-event, it is also possible to detect only one of the on-event or the off-event. Furthermore, the DVS pixel according to the present embodiment can output a DVS luminance signal in addition to the detection signal. As a result, a first DVS image based on the detection signal of the DVS pixel and a second DVS image based on the luminance signal of the DVS pixel are configured.

Meanwhile, the gradation pixel outputs a gradation luminance signal. A gradation image is formed on the basis of the gradation luminance signal output from the gradation pixel. Note that, in the present embodiment, the image based on the detection signal of the DVS pixel is referred to as a first DVS image, the image based on the luminance signal of the DVS pixel is referred to as a second DVS image, and the image based on the gradation luminance signal output from the gradation pixel is referred to as a gradation image.

The solid-state imaging element 200 performs predetermined signal processing such as image recognition processing on the first DVS image, the second DVS image, and the gradation image, and outputs the processed data to the recording unit 120 via a signal line 209.

The recording unit 120 records data from the solid-state imaging element 200. The control unit 130 controls the solid-state imaging element 200 to capture image data.

[Configuration Example of Solid-State Imaging Element]

Figure 2:
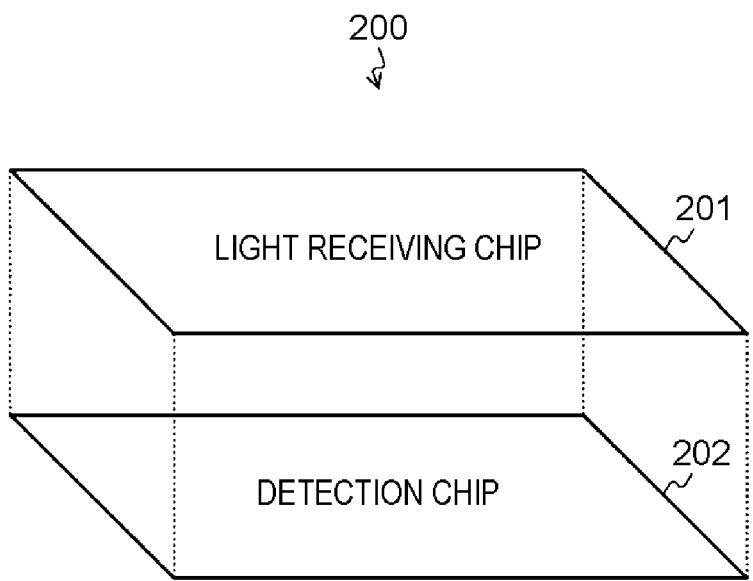
FIG. 2 is a diagram illustrating an example of a laminated structure of a solid-state imaging element.

FIG. 2 is a diagram illustrating an example of a laminated structure of the solid-state imaging element 200 according to the embodiment of the present technology. The solid-state imaging element 200 includes a detection chip 202 and a light receiving chip 201 laminated on the detection chip 202. These substrates are electrically connected via a connection portion such as a via. Note that in addition to the via, connection can also be made by Cu—Cu bonding or a bump.

Figure 3:
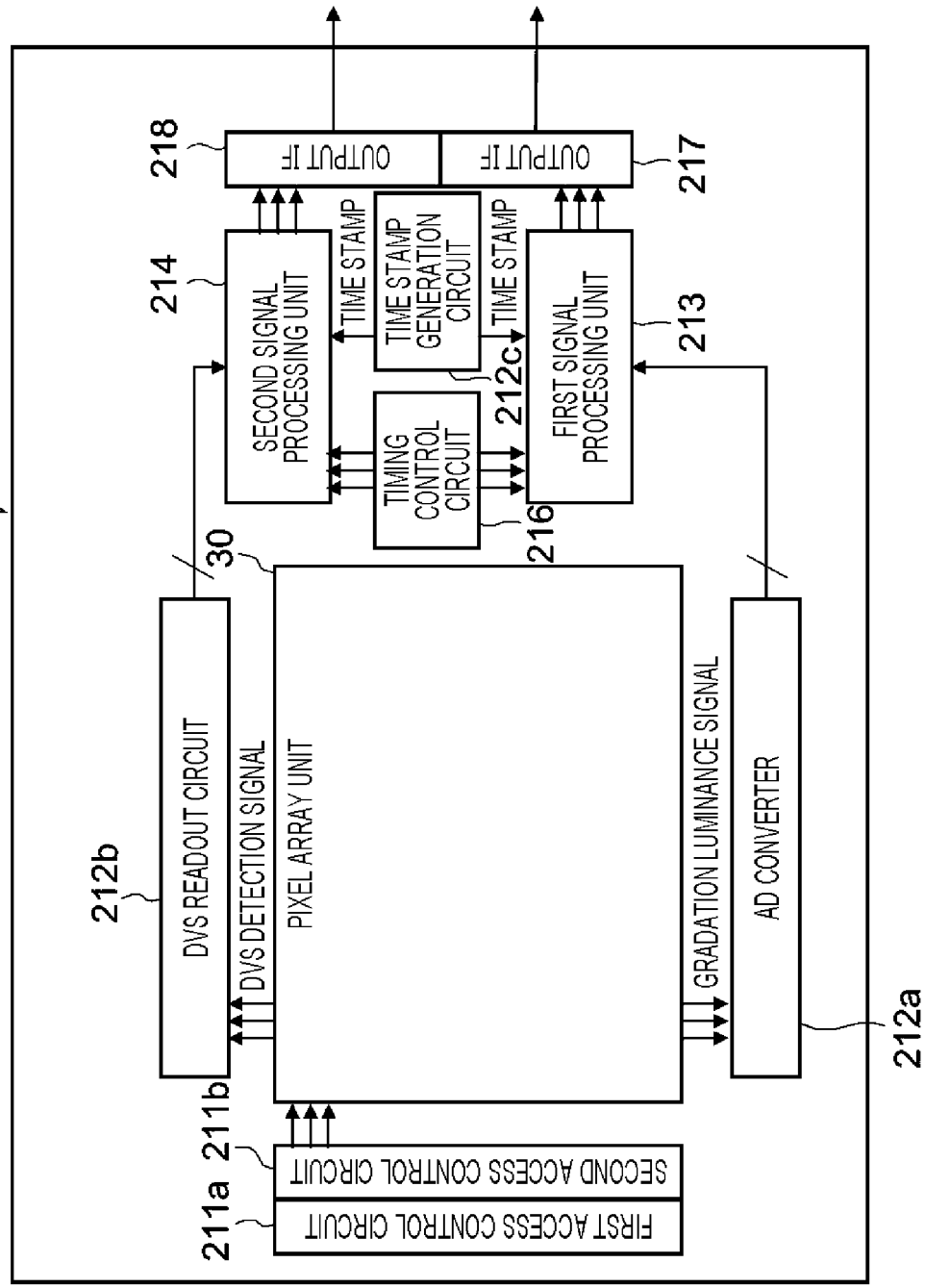
FIG. 3 is a block diagram illustrating a configuration example of the solid-state imaging element.

FIG. 3 is a block diagram illustrating a configuration example of the solid-state imaging element 200. As illustrated in FIG. 3, the solid-state imaging element 200 according to the present disclosure is a device capable of performing asynchronous imaging called DVS and synchronous imaging for a gradation image in parallel. The solid-state imaging element 200 includes a pixel array unit 30, a first access control circuit 211a, a second access control circuit 211b, an AD converter 212a, a DVS readout circuit 212b, a first signal processing unit 213, a second signal processing unit 214, a time stamp generation circuit 212c, a timing control circuit 212d, and output interfaces 217 and 218.

Figure 4:
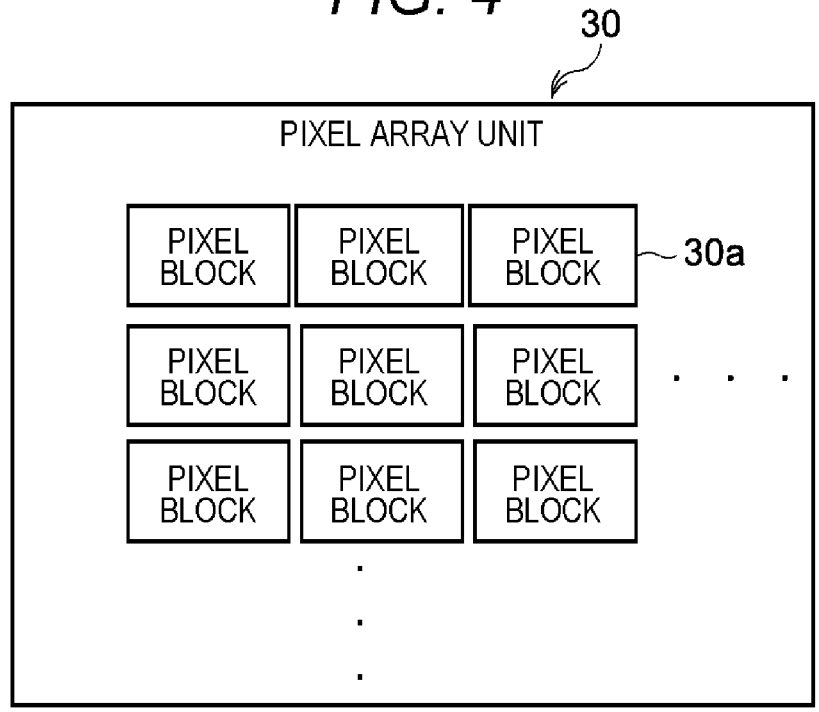
FIG. 4 is a diagram schematically illustrating pixel blocks arranged in a matrix.
Figure 5:
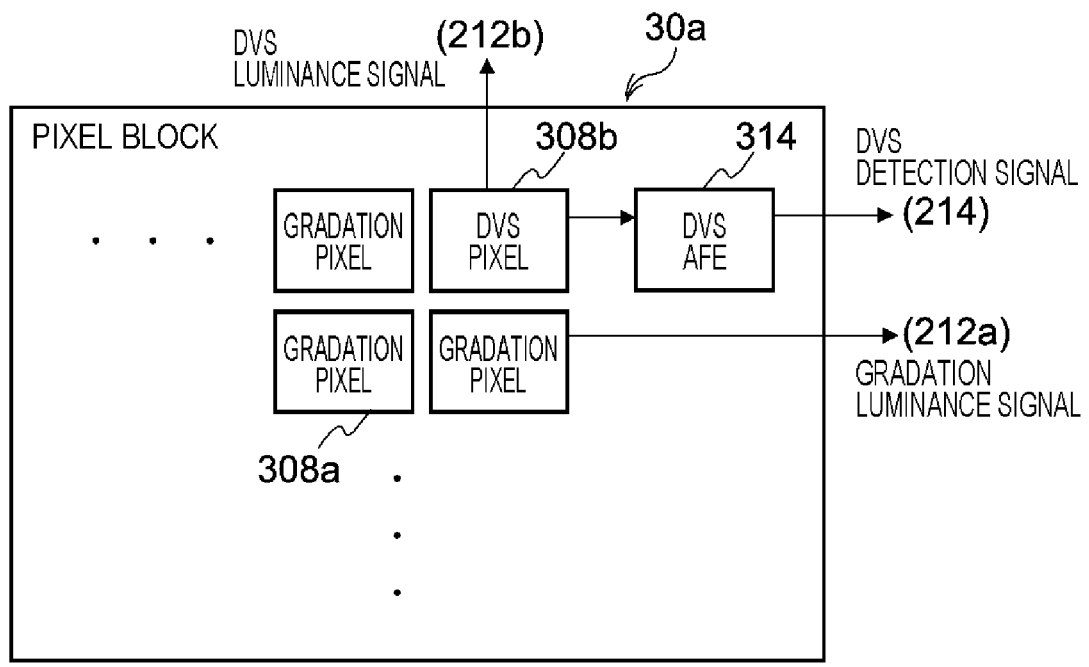
FIG. 5 is a diagram schematically illustrating a configuration of a pixel block.

Here, the configuration of the pixel array unit 30 will be described with reference to FIGS. 4 and 5. FIG. 4 is a diagram schematically illustrating pixel blocks 30a arranged in a matrix in the pixel array unit 30. As illustrated in FIG. 4, in the pixel array unit 30, a plurality of pixel blocks 30a is two-dimensionally arranged in a matrix (array).

The configuration of the pixel block 30a will be described with reference to FIG. 5. FIG. 5 is a diagram schematically illustrating a configuration of the pixel block 30a. As illustrated in FIG. 5, the pixel block 30a includes a plurality of gradation pixels 308a, a DVS pixel 308b, and a DVS AFE (Analog Front End) 314. In the pixel block 30a, the plurality of gradation pixels 308a and the DVS pixel 308b are arranged in a matrix. In this pixel array, a vertical signal line VSL1 to be described later is wired for each pixel column of the gradation pixel 308a. Furthermore, a vertical signal line VSL2 independent of the vertical signal line VSL1 is wired for each pixel column of the DVS pixel 308b. Each of the plurality of gradation pixels 308a generates an analog signal of a voltage corresponding to the photocurrent as a gradation luminance signal (second luminance signal) and outputs the signal to the AD converter 212a (see FIG. 3).

On the other hand, the DVS pixel 308b outputs an analog signal of a voltage corresponding to the photocurrent to the DVS AFE 314. Furthermore, the DVS pixel 308b generates an analog signal of a voltage corresponding to the photocurrent as a DVS luminance signal (first luminance signal), and outputs the signal to the DVS readout circuit 212b (see FIG. 3) in a case where an address event occurs.

The DVS AFE (Analog Front End) 314 generates a detection signal from a voltage signal based on the output of the DVS pixel 308b, and outputs the detection signal to the second signal processing unit 214 (see FIG. 3). More specifically, the DVS AFE 314 detects the presence or absence of an address event on the basis of whether or not the change amount of the photocurrent in the DVS pixel 308b exceeds a predetermined threshold. Then, the DVS AFE 314 outputs the detection signal to the second signal processing unit 214. For example, the DVS AFE 314 outputs the detected address information (X, Y), time stamp information T, and address event information VCH and VCL of the active pixel to the second signal processing unit 214 as, for example, event information (X, Y, T, VCH, VCL). In addition, the DVS AFE 314 is configured in the detection chip 202. The plurality of gradation pixels 308a, the DVS pixel 308b, and the DVS AFE 314 can operate in parallel by an independent control system. Note that the detailed configurations of the gradation pixel 308a, the DVS pixel 308b, and the DVS AFE 314 will be described later.

Returning to FIG. 3 again, the first access control circuit 211a controls the plurality of gradation pixels 308a. The first access control circuit 211a controls resetting of accumulated charges of each of the plurality of gradation pixels 308a, generation of a gradation luminance signal corresponding to an accumulation amount of a photoelectric conversion current, output of a gradation luminance signal, and the like. For example, the first access control circuit 211a causes each of the plurality of gradation pixels 308a to sequentially output the accumulated photoelectric conversion current to the AD converter 212a for each row as a gradation luminance signal. Note that details of the control operation of the gradation pixel 308a will be described later.

The second access control circuit 211b controls the plurality of DVS pixels 308b and the plurality of DVS AFEs 314. The second access control circuit 211b according to the present embodiment causes the plurality of DVS AFEs 314 to sequentially detect the address event for each row, and sequentially output the detection signal to the second signal processing unit 214 for each row.

In addition, in a case where an address event is detected, the second access control circuit 211b causes the luminance signals of the plurality of DVS pixels 308b to be sequentially output to the DVS readout circuit 212b for each row. Note that the second access control circuit 211b according to the present embodiment corresponds to a control circuit.

Figure 6:
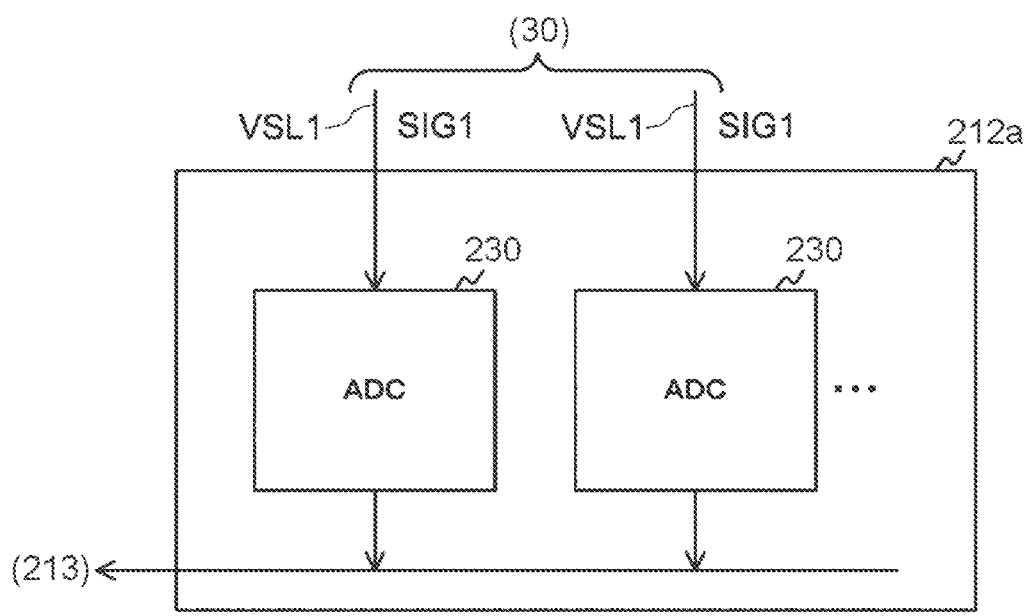
FIG. 6 is a block diagram illustrating a configuration example of an AD conversion unit.

A configuration example of the AD converter 212a will be described with reference to FIG. 6. FIG. 6 is a block diagram illustrating a configuration example of the AD converter 212a. The AD converter 212a includes an ADC 230 for each column of gradation pixels 308a arranged for each pixel block 30a. The ADC 230 converts an analog gradation luminance signal SIG supplied via the vertical signal line VSL1 into a digital signal. This digital signal is converted into a digital pixel signal having a bit number larger than that of the gradation luminance signal SIG1. For example, assuming that the gradation luminance signal SIG1 is 2 bits, the pixel signal is converted into a digital signal of 3 bits or more (16 bits or the like). The ADC 230 supplies the generated digital signal to the first signal processing unit 213. Note that the region of the plurality of gradation pixels 308*a* in the pixel array unit 30 may be divided into a plurality of regions, and the AD converter 212*a* may read the gradation luminance signal SIG1 for each of the plurality of regions. As a result, the gradation luminance signal SIG1 can be read at a higher speed.

Figure 7:
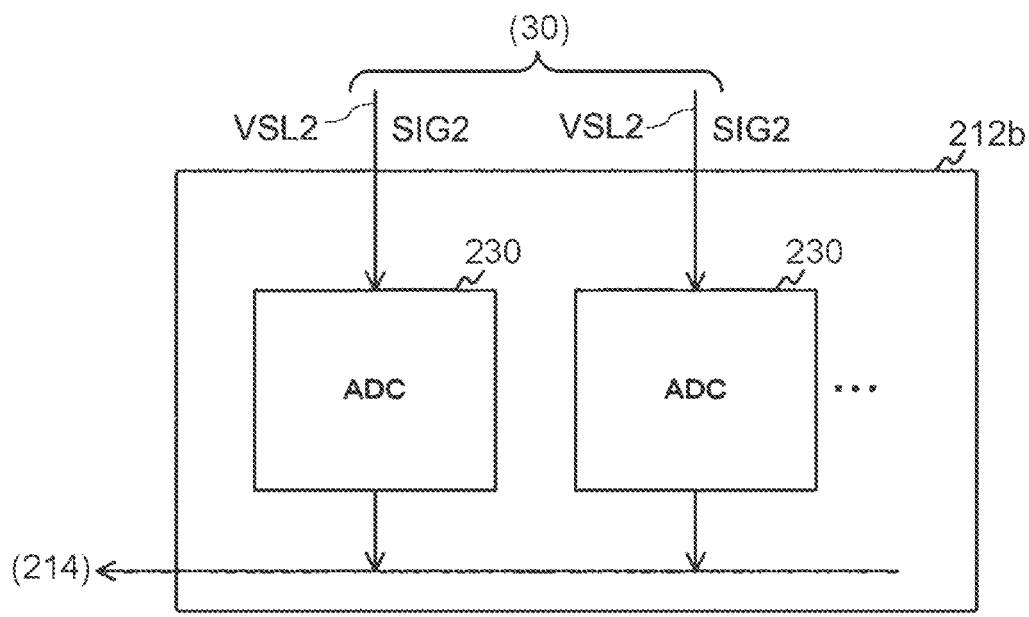
FIG. 7 is a block diagram illustrating a configuration example of a DVS reading circuit.

A configuration example of the DVS readout circuit 212*b* will be described with reference to FIG. 7. FIG. 7 is a block diagram illustrating a configuration example of the DVS readout circuit 212*b*. The DVS readout circuit 212*b* includes an ADC 230 for each column of the DVS pixels 308*b* arranged for each pixel block 307. The ADC 230 converts an analog DVS luminance signal SIG2 supplied via the vertical signal line VSL2 into a digital signal. This digital signal is converted into a digital pixel signal having a bit number larger than that of the DVS luminance signal SIG2. For example, assuming that the DVS luminance signal SIG2 is 2 bits, the pixel signal is converted into a digital signal of 3 bits or more (16 bits or the like). The ADC 230 supplies the generated digital signal to the second signal processing unit 214.

As illustrated in FIG. 3 again, the first signal processing unit 213 executes predetermined signal processing such as correlated double sampling (CDS) processing and image recognition processing on the digital signal from the AD converter 212*a*. The signal processing unit 212 supplies data indicating a processing result and a detection signal to the recording unit 120 via the signal line 209.

The time stamp generation circuit 212*c* generates the time stamp information T and supplies the time stamp information T to each component of the solid-state imaging element 200. For example, the time stamp generation circuit 212*c* supplies the time stamp information T to the plurality of DVS AFEs 314.

The timing control circuit 212*d* controls the timing of each component of the solid-state imaging element 200 on the basis of the time stamp information. For example, the timing control circuit 212*d* controls timings of the first access control circuit 211*a* and the second access control circuit 211*b*. As a result, the luminance signal of the gradation pixel 308*a* read out by the AD converter 212*a* is synchronized with the DVS luminance signal of the DVS pixel 308*b* read out by the DVS readout circuit 212*b*.

As illustrated in FIG. 3 again, the first signal processing unit 213 executes predetermined signal processing such as correlated double sampling (CDS) processing and image recognition processing on the digital signal from the AD converter 212*a*. The signal processing unit 212 supplies data indicating a processing result and a detection signal to the recording unit 120 via the signal line 209. In addition, the first signal processing unit 213 generates image data in a predetermined data format from the digital signal from the AD converter 212*a*.

Figure 8:
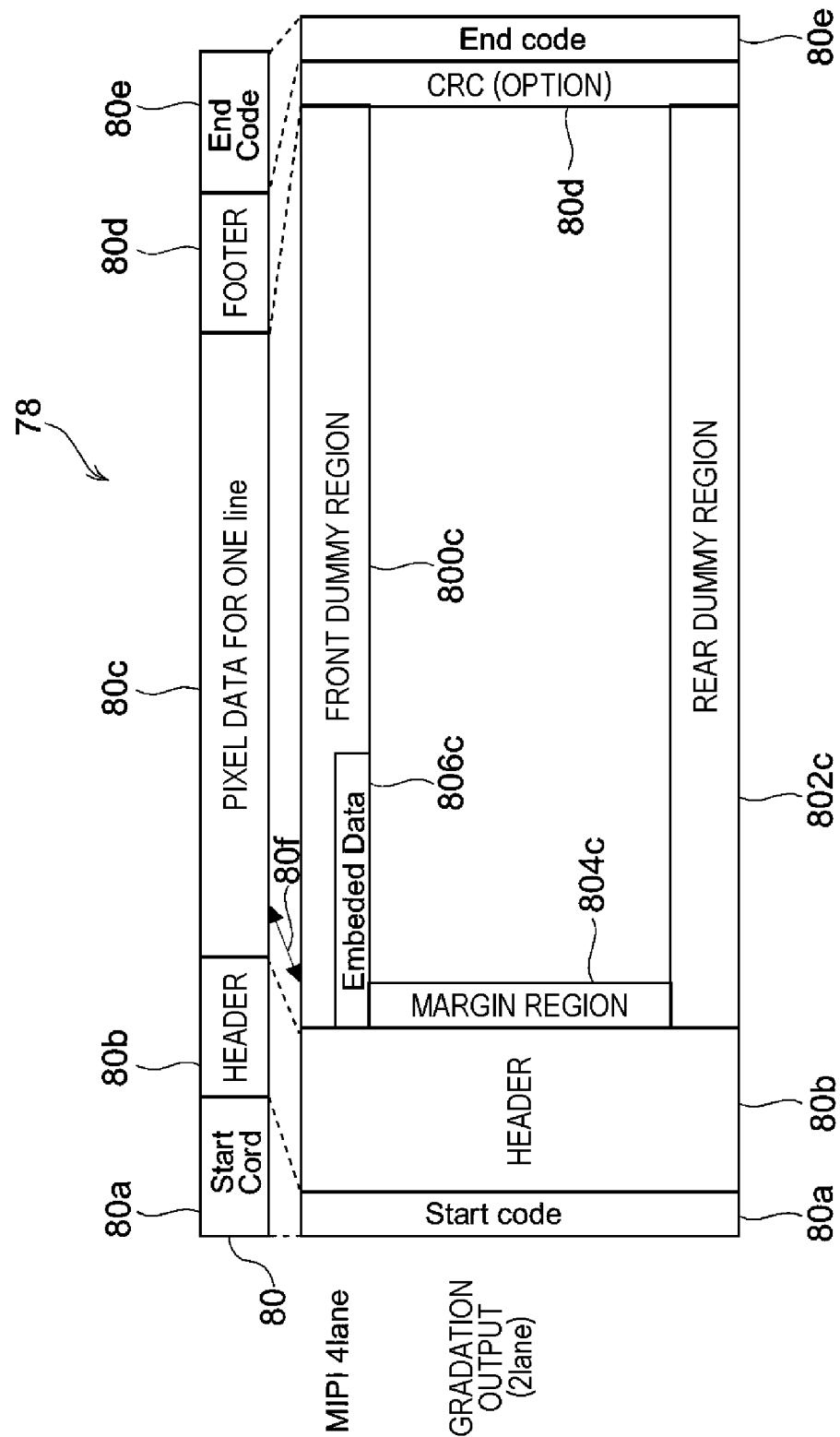
FIG. 8 is a diagram illustrating an example of an image data format generated by a first signal processing unit.

FIG. 8 is a diagram illustrating an example of an image data format generated by the first signal processing unit 213. As illustrated in FIG. 8, image data 78 includes, for example, a plurality of pieces of line image data 80. The line image data 80 includes a start code 80*a*, a header 80*b*, image data 80*c* for one line, a footer 80*d*, and an end code 80*e*. The start code 80*a* indicates the start of line image data 80, and the header 80*b* includes various types of information. Furthermore, the image data 80*c* for one line includes each digital signal of the luminance signal output from the gradation pixels 308*a* for one line of the pixel array unit 30. The footer 80*d* can include various types of information. The end code 80*e* indicates the end of the line image data 80. 80*f* schematically indicates that the plurality of pieces of line image data 80 is arranged in order. Further, the image data 80*c* for one line includes a front dummy region 800*c*, a rear dummy region 802*c*, a margin region 804*c*, and an embedded data region 806*c*. Note that the front dummy region 800*c*, the rear dummy region 802*c*, and the margin region 804 do not need to be provided. The time stamp may be recorded in either the header 80*b* or the embedded data region 806*c*. Furthermore, in the present embodiment, the image data based on the digital signal from the AD converter 212*a* is referred to as a first stream (stream 1).

The second signal processing unit 214 performs predetermined signal processing on the detection signals from the plurality of DVS AFEs 314. The second signal processing unit 214 generates a first DVS image by, for example, arranging detection signals as pixel signals in a two-dimensional lattice pattern.

In addition, the second signal processing unit 214 generates image data in a data format including time stamp information from the digital signal supplied from the DVS readout circuit 212*b*.

Figure 9:
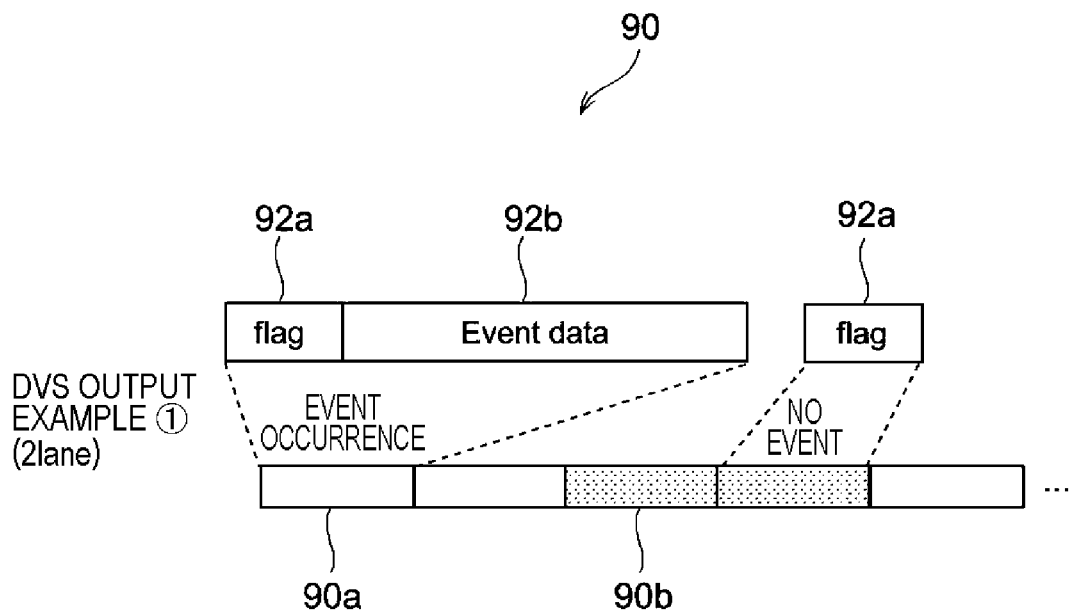
FIG. 9 is a diagram illustrating an example of an image data format of a second DVS image generated by a second signal processing unit.

FIG. 9 is a diagram illustrating an example of an image data format of the second DVS image generated by the second signal processing unit 214. As illustrated in FIG. 9, DVS image data 90 includes a plurality of first packets 90*a* and a plurality of second packets 90*b*. The packets 90*a* and 90*b* are generated for each DVS pixel 308*b*. For example, the first packet 90*a* has information regarding the DVS pixel 308*b* in which the event has occurred. On the other hand, the second packet 90*b* has information regarding the DVS pixel 308*b* in which no event has occurred.

The first packet 90*a* has a flag region 92*a* and an event data region 92*b*. A code indicating an on-event or an off-event is recorded in the flag region 92*a*, and a value of the luminance signal output from the DVS pixel 308*b* and a time stamp at the time of occurrence of the event are recorded in the event data region 92*b*.

The second packet 90*b* has a flag region 92*a*. A code indicating that no event has occurred is recorded in the flag region 92*a* of the second packet 90*b*. In this manner, the DVS image data 90 is generated by a packet corresponding to each DVS pixel 308*b*. Then, the second signal processing unit 214 performs image processing such as image recognition processing on the first DVS image and the second DVS image. In addition, in the present embodiment, the DVS image data based on the digital signal from the DVS readout circuit 212*b* is referred to as a 0th stream (stream 0).

As illustrated in FIG. 3, the output interface 217 outputs the image data and the like supplied from the first signal processing unit 213 to the recording unit 120. Similarly, the output interface 218 outputs the image data and the like supplied from the second signal processing unit 214 to the recording unit 120.

Figure 10:
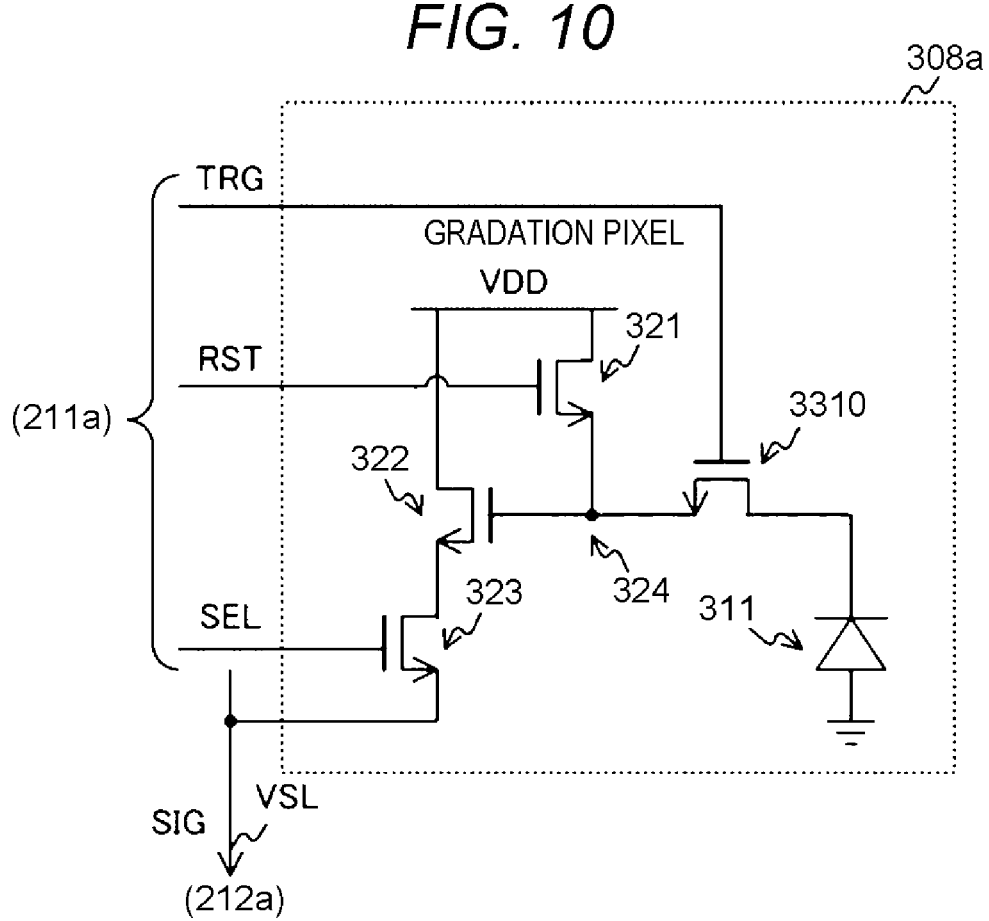
FIG. 10 is a diagram illustrating a configuration example of a gradation pixel.

Here, a detailed configuration example and a control operation example of the gradation pixel 308*a* will be described with reference to FIG. 10. FIG. 10 is a diagram illustrating a configuration example of the gradation pixel 308*a*. As illustrated in FIG. 10, the gradation pixel 308*a* includes a reset transistor 321, an amplification transistor 322, a selection transistor 323, a floating diffusion layer 324, and a light receiving unit 330.

For example, an N-type metal-oxide-semiconductor (MOS) transistor is used as the reset transistor 321, the amplification transistor 322, the selection transistor 323, and a transfer transistor 3310. Furthermore, the photoelectric conversion element 311 is disposed on the light receiving chip 201. All the elements other than the photoelectric conversion element 311 are arranged on the detection chip 202.

The photoelectric conversion element 311 photoelectrically converts incident light to generate a charge.

The charge photoelectrically converted by the photoelectric conversion element 311 is supplied from the photoelectric conversion element 311 to the floating diffusion layer 324 by the transfer transistor 3310. The charge supplied from the photoelectric conversion element 311 is accumulated in the floating diffusion layer 324. The floating diffusion layer 324 generates a voltage signal having a voltage value corresponding to the amount of accumulated charges.

The amplification transistor 322 is connected in series with the selection transistor 323 between the power line of the power supply voltage VDD and the vertical signal line VSL1. The amplification transistor 322 amplifies the voltage signal subjected to charge-voltage conversion by the floating diffusion layer 324.

A selection signal SEL is supplied from the first access control circuit 211a to a gate electrode of the selection transistor 323. In response to the selection signal SEL, the selection transistor 323 outputs the voltage signal amplified by the amplification transistor 322 to the AD converter 212a (see FIG. 3) via the vertical signal line VSL1 as the pixel signal SIG.

[Circuit Configuration Example of DVS Pixel]

Figure 11:
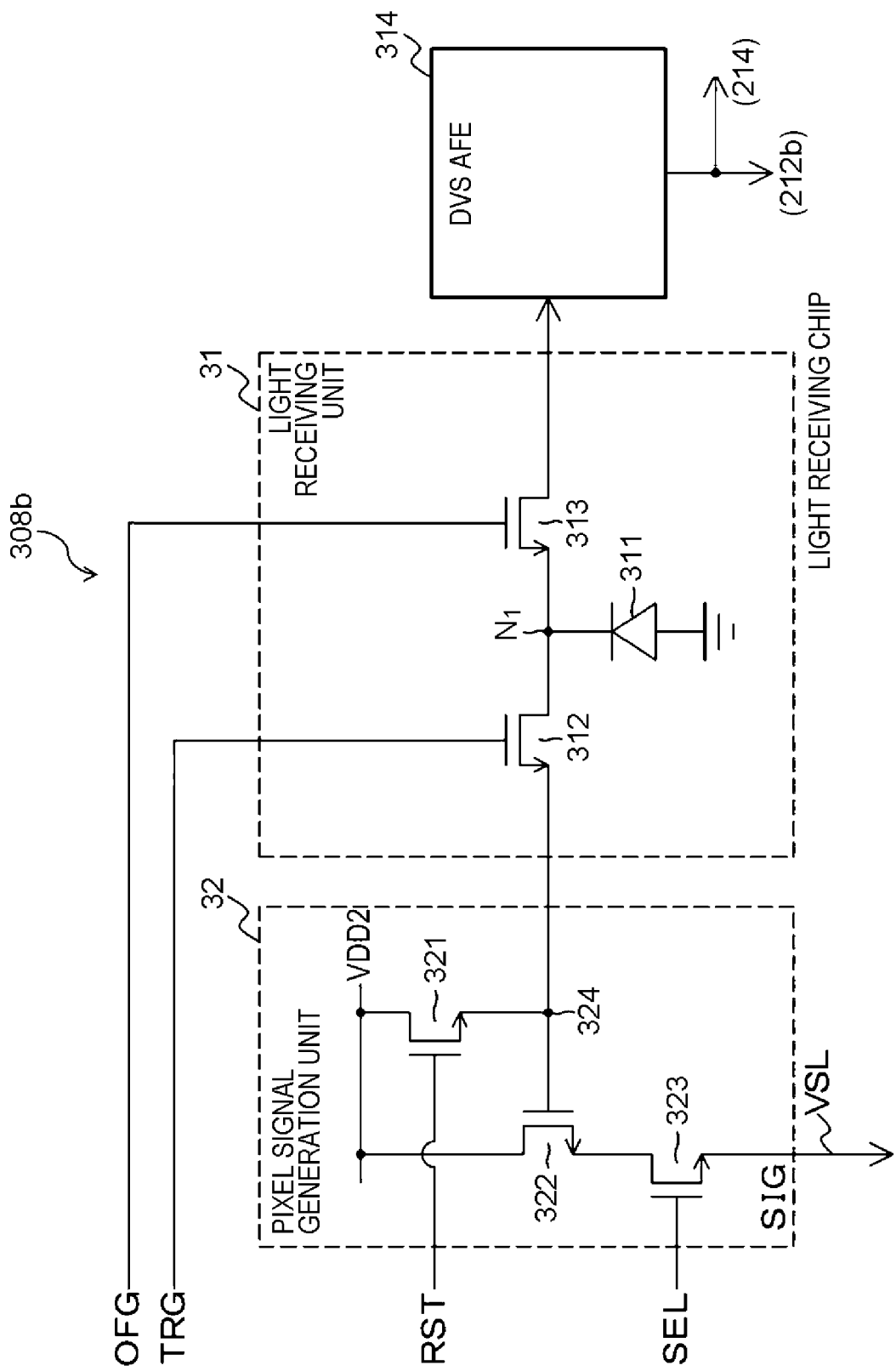
FIG. 11 is a diagram illustrating a configuration example of a DVS pixel.

Here, a detailed configuration example of the DVS pixel 308b will be described with reference to FIG. 11. FIG. 11 is a diagram illustrating a configuration example of the DVS pixel 308b. Each of the plurality of DVS pixels 308b includes a light receiving unit 31, a pixel signal generation unit 32, and a DVS AFE 314.

In the DVS pixel 308b having the above configuration, the light receiving unit 31 includes a light receiving element (photoelectric conversion element) 311, a transfer transistor 312, and an over flow gate (OFG) transistor 313. As the transfer transistor 312 and the OFG transistor 313, for example, an N-type metal oxide semiconductor (MOS) transistor is used. The transfer transistor 312 and the OFG transistor 313 are connected in series to each other.

The light receiving element 311 is connected between a common connection node N1 of the transfer transistor 312 and the OFG transistor 313 and the ground, and photoelectrically converts the incident light to generate a charge of a charge amount corresponding to the amount of the incident light.

A transfer signal TRG is supplied from the second access control circuit 211b illustrated in FIG. 2 to a gate electrode of the transfer transistor 312. In response to the transfer signal TRG, the transfer transistor 312 supplies the charge photoelectrically converted by the light receiving element 311 to the pixel signal generation unit 32.

A control signal OFG is supplied from the second access control circuit 211b to a gate electrode of the OFG transistor 313. In response to the control signal OFG, the OFG transistor 313 supplies the electric signal generated by the light receiving element 311 to the DVS AFE 314. The electric signal supplied to the DVS AFE 314 is a photocurrent including charges.

The pixel signal generation unit 32 includes a reset transistor 321, an amplification transistor 322, a selection transistor 323, and a floating diffusion layer 324. As the reset transistor 321, the amplification transistor 322, and the selection transistor 323, for example, N-type MOS transistors are used.

The charge photoelectrically converted by the light receiving element 311 is supplied from the light receiving unit 31 to the pixel signal generation unit 32 by the transfer transistor 312. The charge supplied from the light receiving unit 31 is accumulated in the floating diffusion layer 324. The floating diffusion layer 324 generates a voltage signal having a voltage value corresponding to the amount of accumulated charges. That is, the floating diffusion layer 324 converts charges into voltage.

The reset transistor 321 is connected between the power line of the power supply voltage VDD and the floating diffusion layer 324. A reset signal RST is supplied from the second access control circuit 211b to a gate electrode of the reset transistor 321. The reset transistor 321 initializes (resets) the charge amount of the floating diffusion layer 324 in response to the reset signal RST.

The amplification transistor 322 is connected in series with the selection transistor 323 between the power line of the power supply voltage VDD and the vertical signal line VSL. The amplification transistor 322 amplifies the voltage signal subjected to charge-voltage conversion by the floating diffusion layer 324.

The selection signal SEL is supplied from the second access control circuit 211b to the gate electrode of the selection transistor 323. In response to the selection signal SEL, the selection transistor 323 outputs the voltage signal amplified by the amplification transistor 322 to the DVS readout circuit 212b (see FIG. 2) via the vertical signal line VSL as the pixel signal SIG.

In the imaging device 100 including the pixel array unit 30 in which the DVS pixels 308b having the above-described configuration are two-dimensionally arranged, when the control unit 13 illustrated in FIG. 1 instructs to start detection of an address event, the second access control circuit 211b supplies the control signal OFG to the OFG transistor 313 of the light receiving unit 31, thereby driving the OFG transistor 313 to supply photocurrent to the DVS AFE 314.

Then, when an address event is detected in a certain DVS pixel 308b, the second access control circuit 211b turns off the OFG transistor 313 of the DVS pixel 308b to stop the supply of photocurrent to the DVS AFE 314. Next, the second access control circuit 211b supplies a transfer signal TRG to the transfer transistor 312 to drive the transfer transistor 312, and transfers the charge photoelectrically converted by the light receiving element 311 to the floating diffusion layer 324.

In this manner, the imaging device 100 including the pixel array unit 30 in which the DVS pixels 308b having the above-described configuration are two-dimensionally arranged outputs only the pixel signal of the DVS pixel 308b in which the address event is detected to the DVS readout circuit 212b. As a result, regardless of the presence or absence of the address event, the power consumption of the imaging device 100 and the processing amount of the image processing can be reduced as compared with the case of outputting the pixel signals of all the pixels.

Note that the configuration of the DVS pixel 308b exemplified here is an example, and is not limited to this configuration example. For example, the pixel configuration does not to include the pixel signal generation unit 32. In the case of this pixel configuration, the OFG transistor 313 may be omitted in the light receiving unit 31, and the transfer transistor 312 is only required to have the function of the OFG transistor 313.

[First Configuration Example of DVS AFE]

Figure 12:
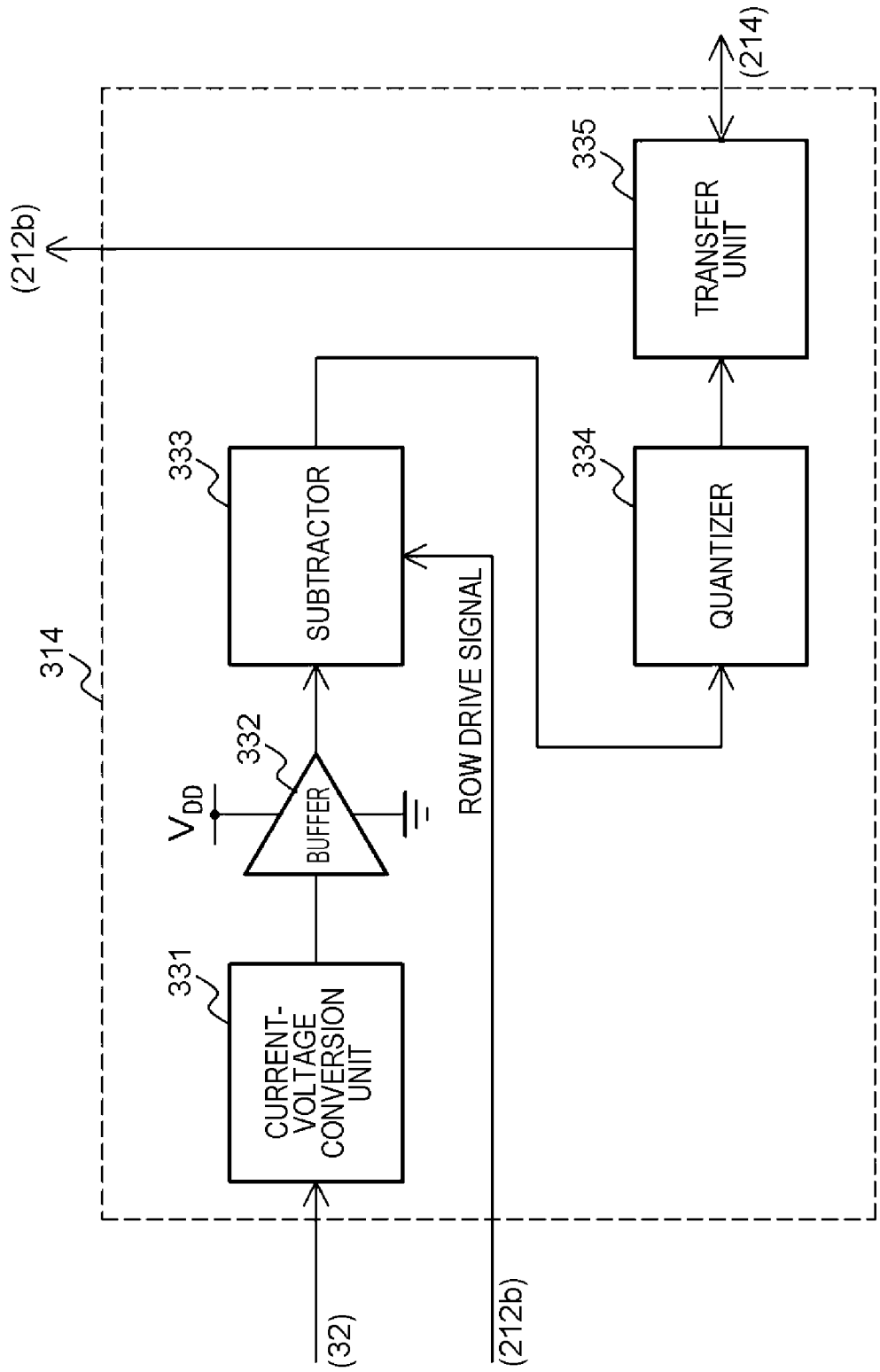
FIG. 12 is a block diagram illustrating a first configuration example of an AFE for DVS.

FIG. 12 is a block diagram illustrating a first configuration example of the DVS AFE 314. As illustrated in FIG. 12, the DVS AFE 314 according to the present configuration example includes a current-voltage conversion unit 331, a buffer 332, a subtractor 333, a quantizer 334, and a transfer unit 335.

The current-voltage conversion unit 331 converts the photocurrent from the light receiving unit 31 of the gradation pixel 308a into a voltage signal of the logarithm. The current-voltage conversion unit 331 supplies the converted voltage signal to the buffer 332. The buffer 332 buffers the voltage signal supplied from the current-voltage conversion unit 331 and supplies the voltage signal to the subtractor 333.

A row drive signal is supplied from the second access control circuit 211b to the subtractor 333. The subtractor 333 lowers the level of the voltage signal supplied from the buffer 332 in accordance with the row drive signal. Then, the subtractor 333 supplies the voltage signal after the level reduction to the quantizer 334. The quantizer 334 quantizes the voltage signal supplied from the subtractor 333 into a digital signal and outputs the digital signal to the transfer unit 335 as a detection signal of an address event.

The transfer unit 335 transfers the detection signal of the address event supplied from the quantizer 334 to the second signal processing unit 214 and the like. When an address event is detected, the transfer unit 335 supplies a detection signal of the address event to the second signal processing unit 214 and the second access control circuit 211b.

Next, configuration examples of the current-voltage conversion unit 331, the subtractor 333, and the quantizer 334 in the DVS AFE 314 will be described.

(Configuration Example of Current-Voltage Conversion Unit)

Figure 13:
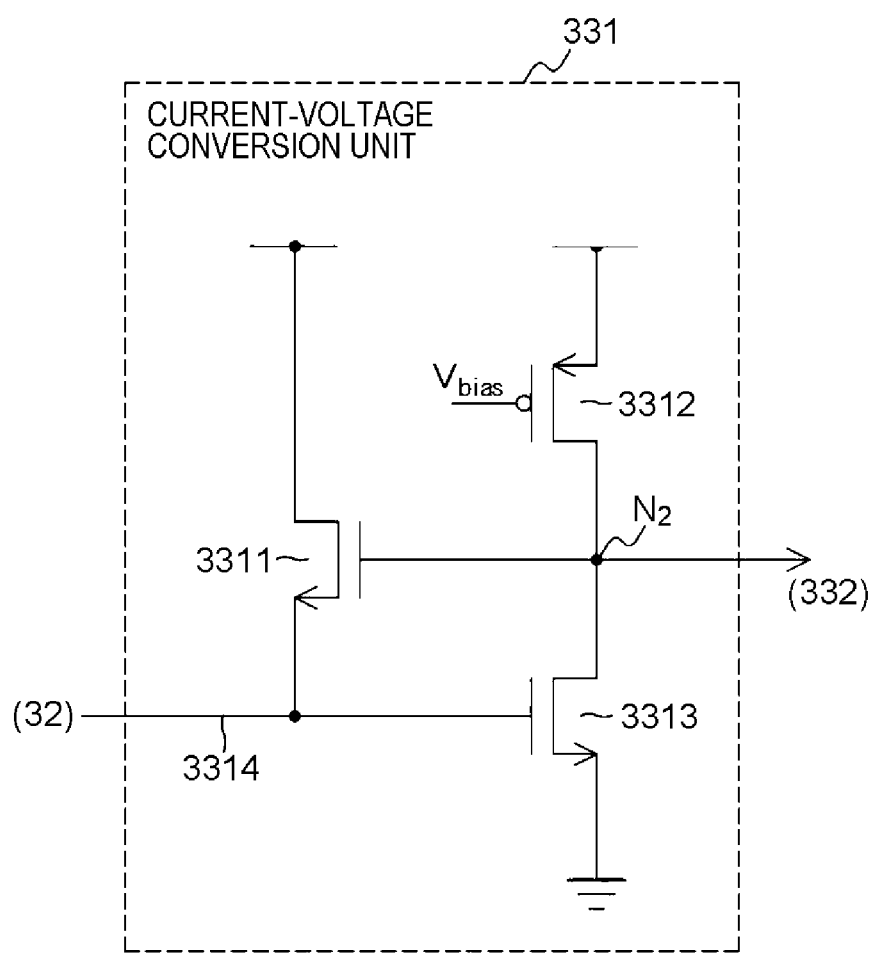
FIG. 13 is a circuit diagram illustrating an example of a configuration of a current-voltage conversion unit.

FIG. 13 is a circuit diagram illustrating an example of a configuration of the current-voltage conversion unit 331 in the DVS AFE 314. As illustrated in FIG. 13, the current-voltage conversion unit 331 according to the present example has a circuit configuration including an N-type transistor 3311, a P-type transistor 3312, and an N-type transistor 3313. As these transistors 3311 to 3313, for example, MOS transistors are used.

The N-type transistor 3311 is connected between the power line of the power supply voltage VDD and a signal input line 3314. The P-type transistor 3312 and the N-type transistor 3313 are connected in series between the power line of the power supply voltage VDD and the ground. In addition, the gate electrode of the N-type transistor 3311 and the input terminal of the buffer 332 illustrated in FIG. 11 are connected to a common connection node N2 of the P-type transistor 3312 and the N-type transistor 3313.

A predetermined bias voltage Vbias is applied to the gate electrode of the P-type transistor 3312. As a result, the P-type transistor 3312 supplies a constant current to the N-type transistor 3313. A photocurrent is input from the light receiving unit 31 to the gate electrode of the N-type transistor 3313 through the signal input line 3314.

Drain electrodes of the N-type transistor 3311 and the N-type transistor 3313 are connected to a power supply side, and such a circuit is called a source follower. The photocurrent from the light receiving unit 31 is converted into a logarithmic voltage signal by the two source followers connected in the loop shape.

(Configuration Examples of Subtractor and Quantizer)

Figure 14:
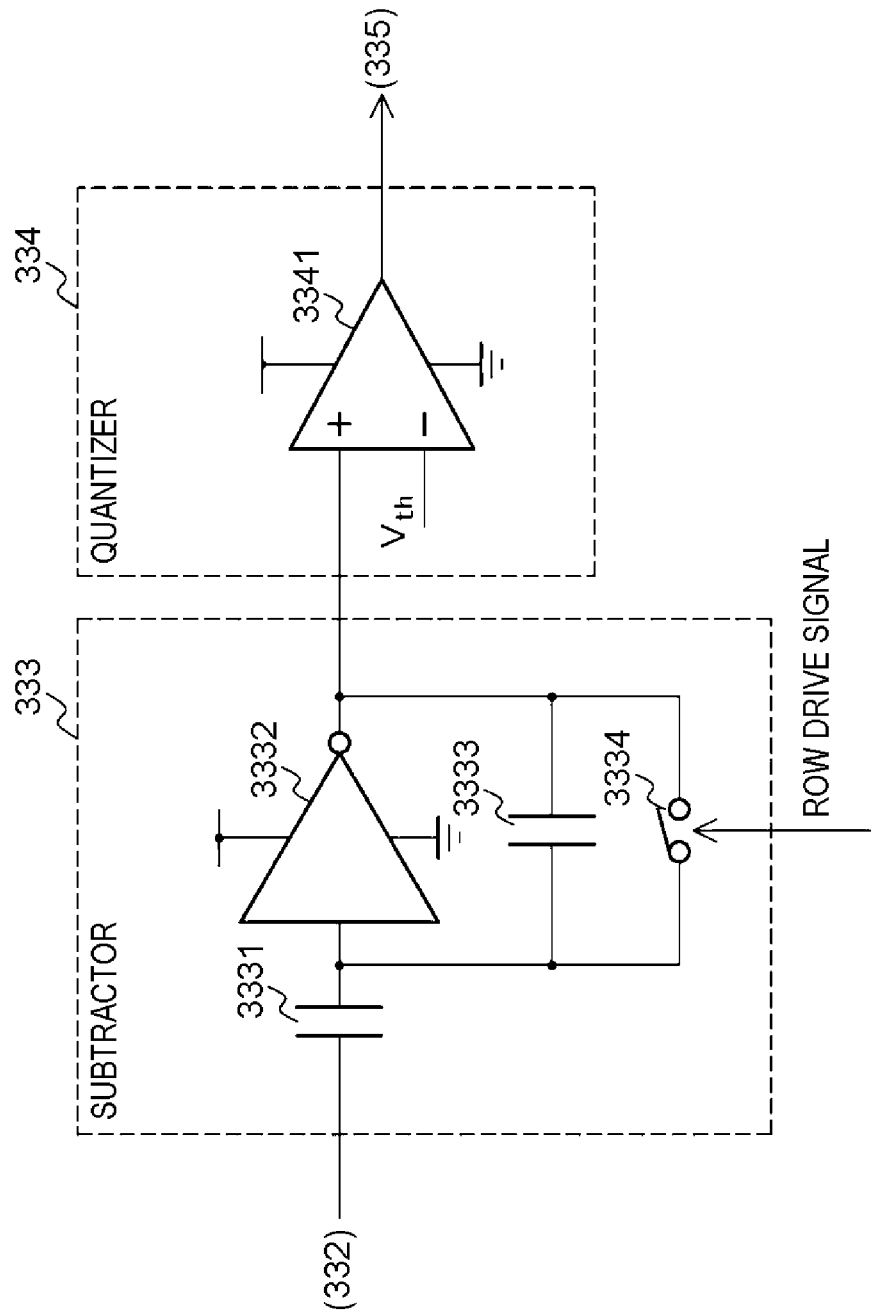
FIG. 14 is a circuit diagram illustrating an example of a configuration of a subtractor and a quantizer.

FIG. 14 is a circuit diagram illustrating an example of configurations of the subtractor 333 and the quantizer 334 in the DVS AFE 314.

The subtractor 333 according to the present example includes a capacitive element 3331, an inverter circuit 3332, a capacitive element 3333, and a switch element 3334.

One end of the capacitive element 3331 is connected to the output terminal of the buffer 332 illustrated in FIG. 14, and the other end thereof is connected to the input terminal of the inverter circuit 3332. The capacitive element 3333 is connected in parallel to the inverter circuit 3332. The switch element 3334 is connected between both ends of the capacitive element 3333. A row drive signal is supplied from the second access control circuit 211b to the switch element 3334 as an opening/closing control signal. The switch element 3334 opens and closes a path connecting both ends of the capacitive element 3333 in response to the row drive signal. The inverter circuit 3332 inverts the polarity of the voltage signal input via the capacitive element 3331.

In the subtractor 333 having the above configuration, when the switch element 3334 is turned on (closed), a voltage signal Vinit is input to the terminal of the capacitive element 3331 on the buffer 332 side, and the terminal on the opposite side becomes a virtual ground terminal. The potential of the virtual ground terminal is set to zero for convenience. At this time, when the capacitance value of the capacitive element 3331 is C1, the charge Qinit accumulated in the capacitive element 3331 is expressed by the following formula (1). On the other hand, since both ends of the capacitive element 3333 are short-circuited, the accumulated charge becomes zero.

$$Q\text{init} = C1 \times V\text{init} \tag{1}$$

Next, considering a case where the switch element 3334 is turned off (open) and the voltage of the terminal of the capacitive element 3331 on the buffer 332 side changes to Vafter, the charge Qafter accumulated in the capacitive element 3331 is expressed by the following formula (2).

$$Q\text{after} = C1 \times V\text{after} \tag{2}$$

On the other hand, when the capacitance value of the capacitive element 3333 is C2 and the output voltage is Vout, the charge Q2 accumulated in the capacitive element 3333 is expressed by the following formula (3).

$$Q2 = -C2 \times V\text{out} \tag{3}$$

At this time, since the total charge amount of the capacitive element 3331 and the capacitive element 3333 does not change, the following formula (4) is established.

$$Q\text{init} = Q\text{after} + Q2 \tag{4}$$

When the formulae (1) to (3) are substituted into the formula (4) and deformed, the following formula (5) is obtained.

$$V\text{out} = -(C1/C2) \times (V\text{after} - V\text{init}) \tag{5}$$

The formula (5) represents the subtraction operation of the voltage signal, and the gain of the subtraction result is C1/C2. Since it is usually desired to maximize the gain, it is preferable to design C1 to be large and C2 to be small. On the other hand, when C2 is too small, kTC noise increases, and noise characteristics may deteriorate. Therefore, capacity reduction of C2 is limited to a range in which noise can be tolerated. Furthermore, since the DVS AFE 314 including the subtractor 333 is mounted for each DVS pixel 308b, the capacitive element 3331 and the capacitive element 3333 have area restrictions. In consideration of these, the capacitance values C1 and C2 of the capacitive elements 3331 and 3333 are determined.

In FIG. 14, the quantizer 334 includes a comparator 3341. The comparator 3341 takes the output signal of the inverter circuit 3332, that is, the voltage signal from the subtractor 333 as a non-inverting (+) input, and takes a predetermined threshold voltage Vth as an inverting (−) input. Then, the comparator 3341 compares the voltage signal from the subtractor 333 with the predetermined threshold voltage Vth, and outputs a signal indicating a comparison result to the transfer unit 335 as an address event detection signal.

[Second Configuration Example of DVS AFE]

Figure 15:
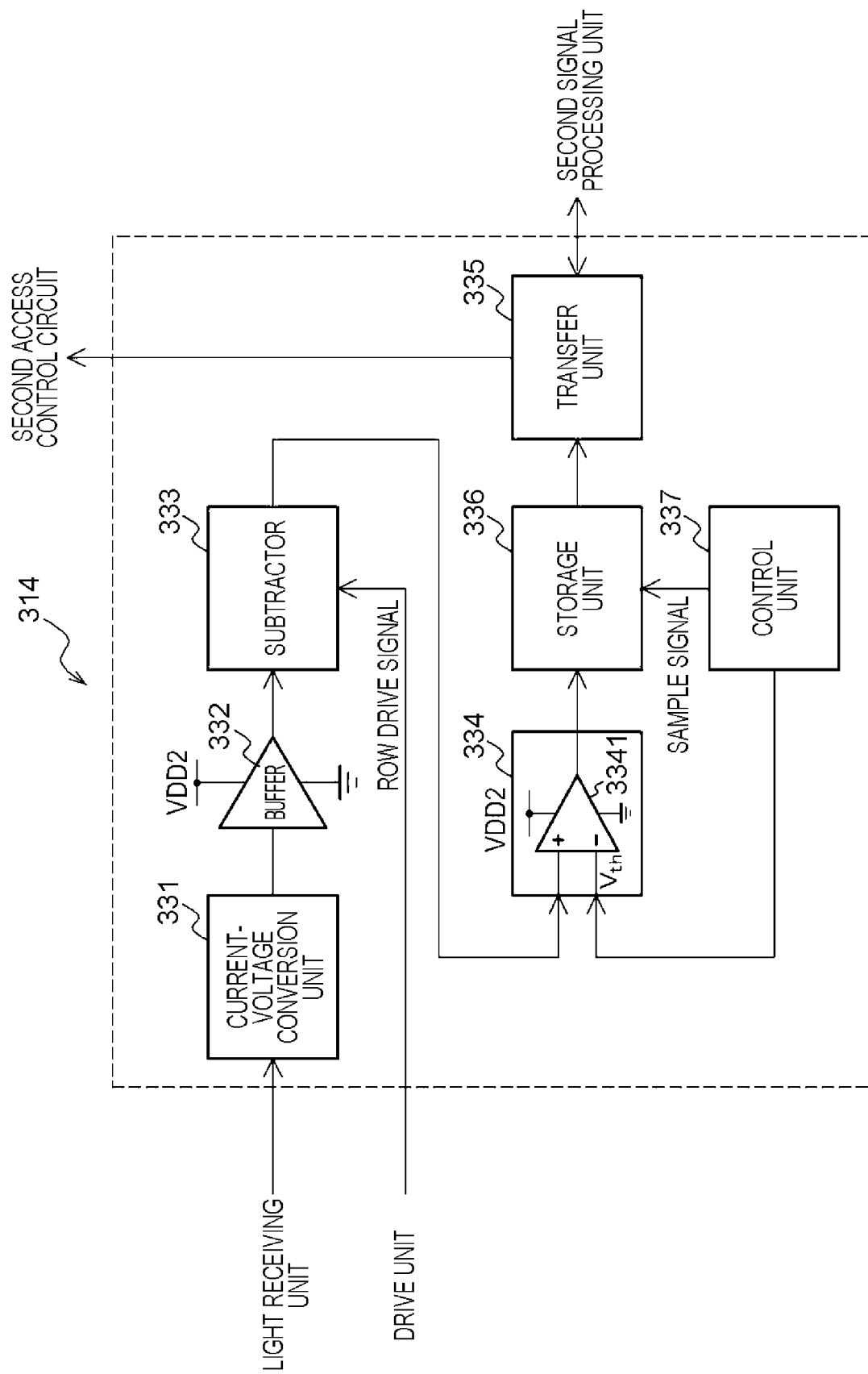
FIG. 15 is a block diagram illustrating a second configuration example of an AFE for DVS.

FIG. 15 is a block diagram illustrating a second configuration example of the DVS AFE 14. As illustrated in FIG. 15, the DVS AFE 314 according to the present configuration example includes a storage unit 336 and a control unit 337 in addition to the current-voltage conversion unit 331, the buffer 332, the subtractor 333, the quantizer 334, and the transfer unit 335.

The storage unit 336 is provided between the quantizer 334 and the transfer unit 335, and accumulates the output of the quantizer 334, that is, the comparison result of the comparator 3341 on the basis of a sample signal supplied from the control unit 337. The storage unit 336 may be a sampling circuit such as a switch, plastic, or a capacitor, or may be a digital memory circuit such as a latch or a flip-flop.

The control unit 337 supplies a predetermined threshold voltage Vth to the inverting (−) input terminal of the comparator 3341. The threshold voltage Vth supplied from the control unit 337 to the comparator 3341 may have different voltage values in a time division manner. For example, the control unit 337 supplies a threshold voltage Vth1 corresponding to the on-event indicating that the change amount of the photocurrent exceeds the upper limit threshold and a threshold voltage Vth2 corresponding to the off-event indicating that the change amount falls below the lower limit threshold at different timings, so that one comparator 3341 can detect a plurality of types of address events.

For example, the storage unit 336 may accumulate the comparison result of the comparator 3341 using the threshold voltage Vth1 corresponding to the on-event in a period in which the threshold voltage Vth2 corresponding to the off-event is supplied from the control unit 337 to the inverting (−) input terminal of the comparator 3341. Note that the storage unit 336 may be inside the DVS pixel 308b or outside the DVS pixel 308b. In addition, the storage unit 336 is not an essential component of the DVS AFE 314. That is, the storage unit 336 may be omitted.

Here, an imaging control example of the solid-state imaging element 200 will be described with reference to FIG. 16.

Figure 16:
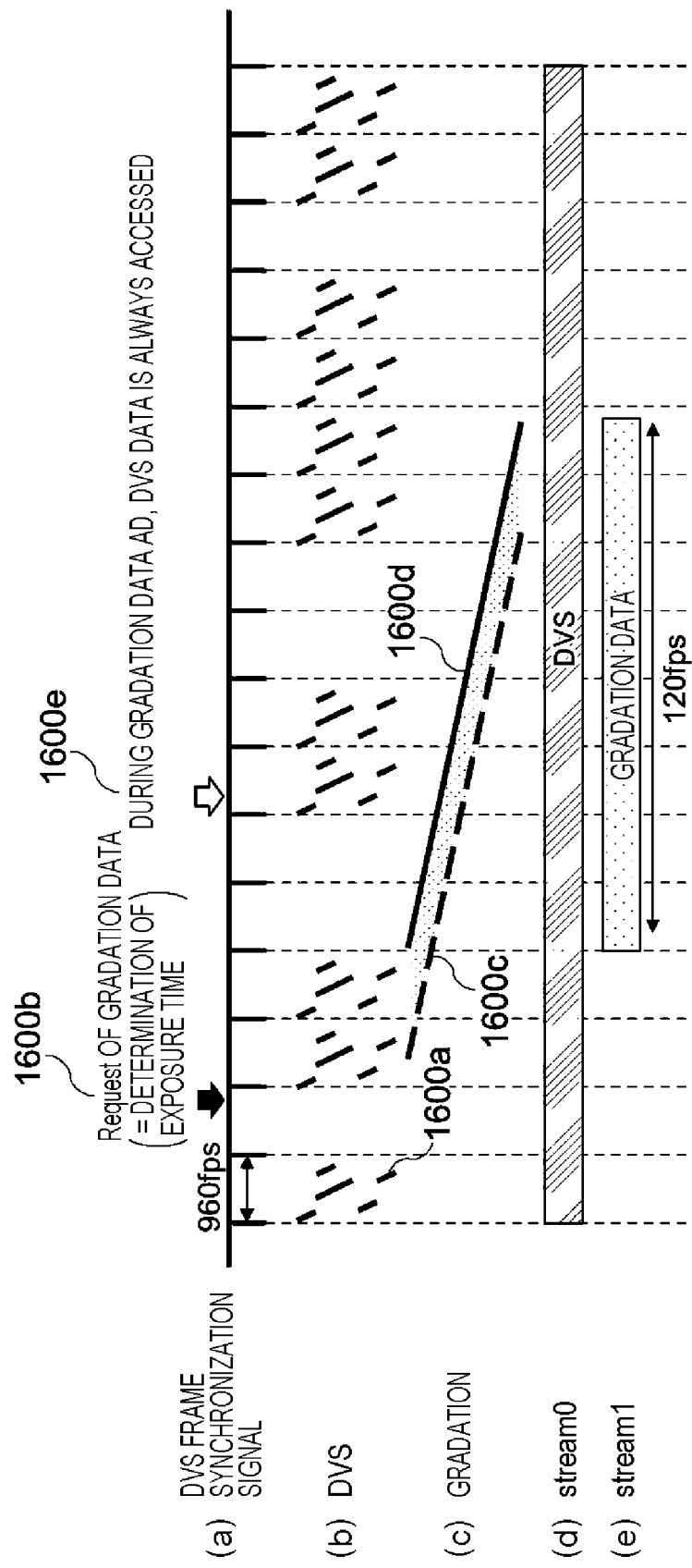
FIG. 16 is a diagram illustrating an imaging control example by a timing control circuit.

FIG. 16 is a diagram illustrating an imaging control example by the timing control circuit 212d using a time stamp. The horizontal axis represents time.

A DVS synchronization signal (a) indicates timing to start reading of the DVS pixel 308b. For example, the timing control circuit 212d repeats reading of the DVS pixels 308b for one frame in 960 (fps) cycles on the basis of the time stamp.

A DVS reading (b) indicates a reading position and time of the DVS pixel 308b. The vertical axis corresponds to the row of the pixel array unit 30. The timing control circuit 212d detects the event of the DVS pixel 308 for each row according to a 960 (fps) cycle, and reads the luminance signal from the DVS pixel 308 in which the event has occurred via the DVS readout circuit 212b.

Reading of the gradation data (c) indicates a reading position and time from the gradation pixel 308a. The vertical axis corresponds to the row of the pixel array unit 30. When there is a request 1600b for image data from the control unit 130 (FIG. 1), the timing control circuit 212d starts reading from the gradation pixels 308a at a timing coincident with the read start timing of the DVS synchronization signal (a) according to the time stamp. That is, the timing control circuit 212d generates a gradation synchronization signal for starting reading from the gradation pixel 308a using the DVS synchronization signal (a).

In addition, the timing control circuit 212d starts exposure at an exposure start timing 1600c and ends the exposure at an exposure end timing 1600d according to the time stamp. During this period, at timing 1600e, reading from any of the DVS pixels 308b is always continued. As a result, the fluctuation of the power consumption of the DVS pixel 308b is suppressed, and noise at the time of reading from the gradation pixel 308a is suppressed.

A stream0 (d) indicates a reading time of the DVS pixel 308b. As described above, reading from any of the DVS pixels 308b is always continued. As a result, the fluctuation of the power consumption of the DVS pixel 308b is suppressed, and noise at the time of reading from the gradation pixel 308a is suppressed.

A stream1 (e) indicates a reading time from the gradation pixel 308a. The reading time from the gradation pixel 308a corresponds to the exposure end timing 1600d.

As described above, according to the present embodiment, in addition to the AD converter 212a that reads luminance signals from the gradation pixels 308a, a DVS readout circuit 212b that reads luminance signals from the plurality of DVS pixels 308b is provided. As a result, reading of the luminance signal from the gradation pixel 308a and reading of the luminance signal from the DVS pixel 308b can be performed simultaneously, and generation of the gradation image data and the DVS image data can be made faster.

(Modification 1 of first Embodiment)

An imaging device 100 according to Modification 1 of the first embodiment is different from the imaging device 100 according to the first embodiment in that a luminance signal from the DVS pixel 308b is read out in units of rows in which an address event has occurred. Hereinafter, differences from the imaging device 100 according to the first embodiment will be described.

Figure 17:
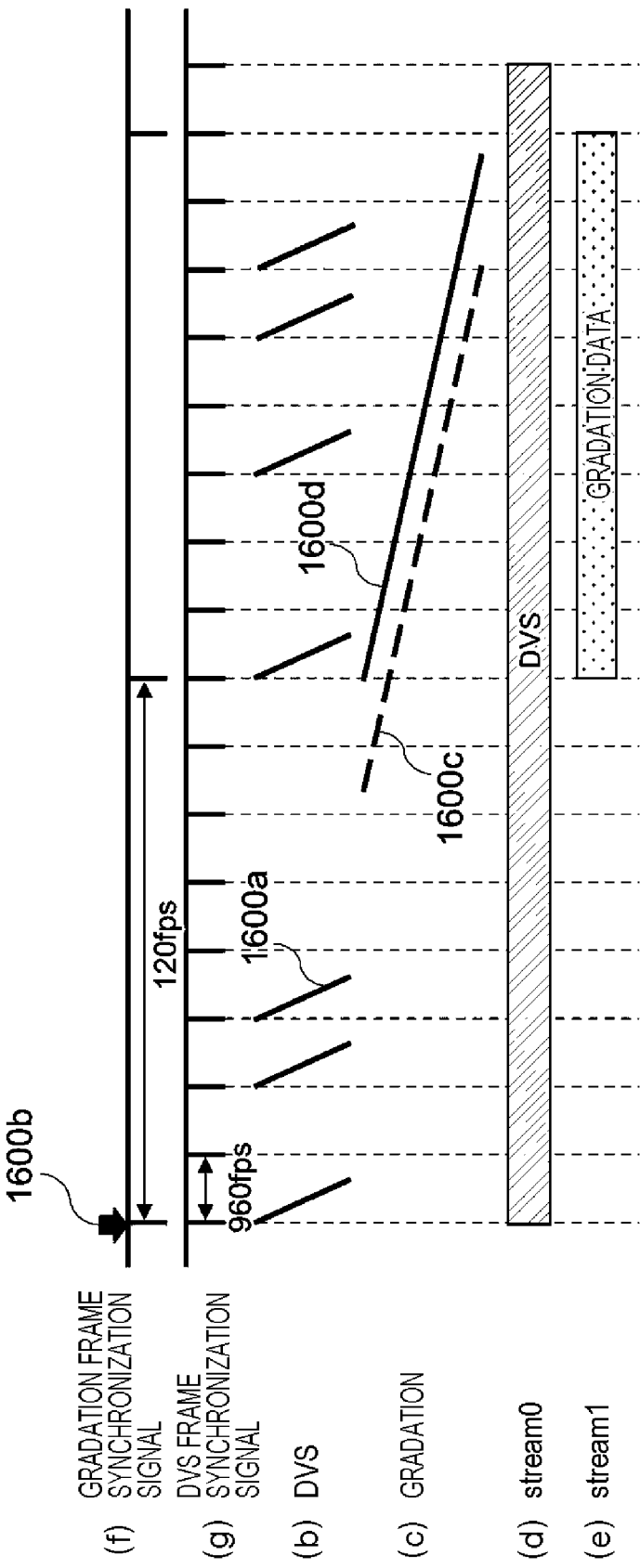
FIG. 17 is a diagram illustrating an imaging control example according to Modification 1 of a first embodiment using a time stamp.

FIG. 17 is a diagram illustrating an imaging control example according to Modification 1 of the first embodiment using a time stamp. The horizontal axis represents time.

A gradation frame synchronization signal (f) indicates a timing to start reading of the gradation pixel 308a. When there is a request 1600b for image data from the control unit 130 (FIG. 1), the timing control circuit 212d generates a gradation frame synchronization signal corresponding to the exposure time.

A DVS frame synchronization signal (g) indicates a timing to start reading for each frame from the DVS pixel 308b. For example, the timing control circuit 212d generates the DVS frame synchronization signal of 960 (fps) cycles using the gradation frame synchronization signal on the basis of the time stamp. In a case where an address event has occurred in any of the DVS pixels 308b, the timing control circuit 212d reads the luminance signal from each of the DVS pixels 308b in the row order from the DVS pixel 308b in the row in which the address event has occurred.

Figure 18:
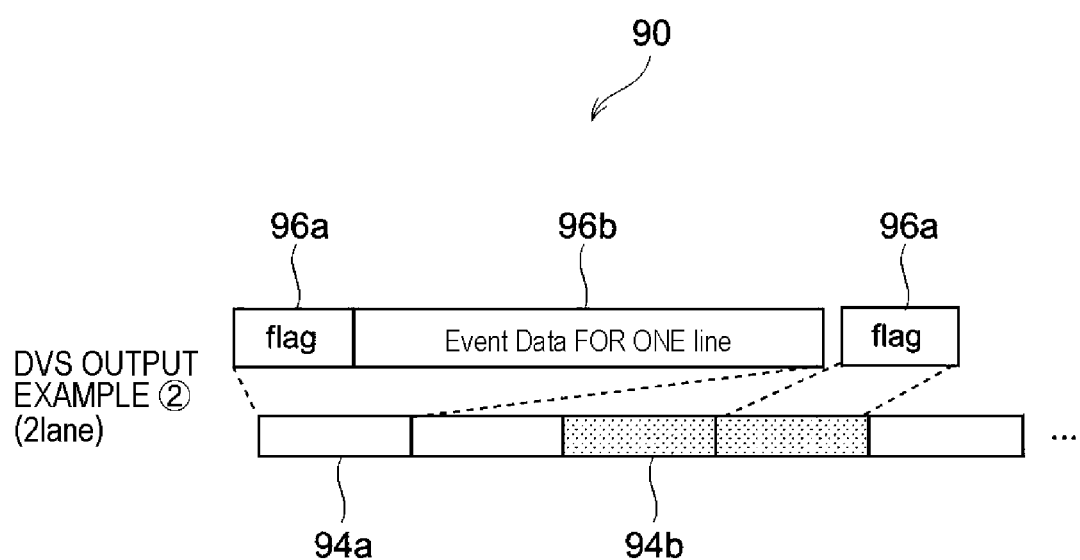
FIG. 18 is a diagram illustrating an example of another image data format of the second DVS image generated by the second signal processing unit.

FIG. 18 is a diagram illustrating an example of an image data format of a second DVS image generated by the second signal processing unit 214 according to Modification 1 of the first embodiment. As illustrated in FIG. 18, the DVS image data 90 includes a plurality of first packets 94a and a plurality of second packets 94b. The packets 94a and 94b are generated for each row in one frame of the DVS pixels 308b. For example, the first packet 94a has information regarding the DVS pixel 308b in the row in which the event has occurred. On the other hand, the second packet 94b has information regarding the DVS pixel 308b in the row in which no event has occurred.

The first packet 94a includes a flag region 96a and an event data region 96b. A code indicating an on-event or an off-event is recorded in the flag region 96a, and an event occurrence row, a time stamp at the time of occurrence of the event, and event data of one row are recorded in the event data region 96b. Note that the event data corresponds to a luminance signal. In a region corresponding to the DVS pixel 308b in which no event has occurred, a time stamp at the time of occurrence of the vent is not recorded, and for example, a null "0" is input. The second packet 94b has a flag region 96a. A code indicating that no event has occurred is recorded in the flag region 96a of the second packet 94b. In this manner, the DVS image data 90 is generated by a packet corresponding to each row in one frame of the DVS pixels 308b.

In addition, the second signal processing unit 214 may change the data format of the DVS image data based on the first luminance signal depending on the number of occurrences of address events. For example, in a case where the number of occurrences of address events per frame exceeds a predetermined value, the second signal processing unit 214 may change the data format to the data format illustrated in FIG. 20 to be described later. This is because when the number of occurrences of address events exceeds a predetermined value, there is a case where the data amount and the data processing speed become faster in the data format illustrated in FIG. 20.

As described above, according to Modification 1 of the first embodiment, the luminance signal from the DVS pixel 308b is read in units of frame rows. Therefore, in addition to the effects described in the first embodiment, it is possible to update the image data in units of rows in which the address event has occurred in the second DVS image.

(Modification 2 of First Embodiment)

An imaging device 100 according to Modification 2 of the first embodiment is different from the imaging device 100 according to the first embodiment in that a luminance signal from the DVS pixel 308b is read out in units of rows in which an address event has occurred. Hereinafter, differences from the imaging device 100 according to the first embodiment will be described.

Figure 19:
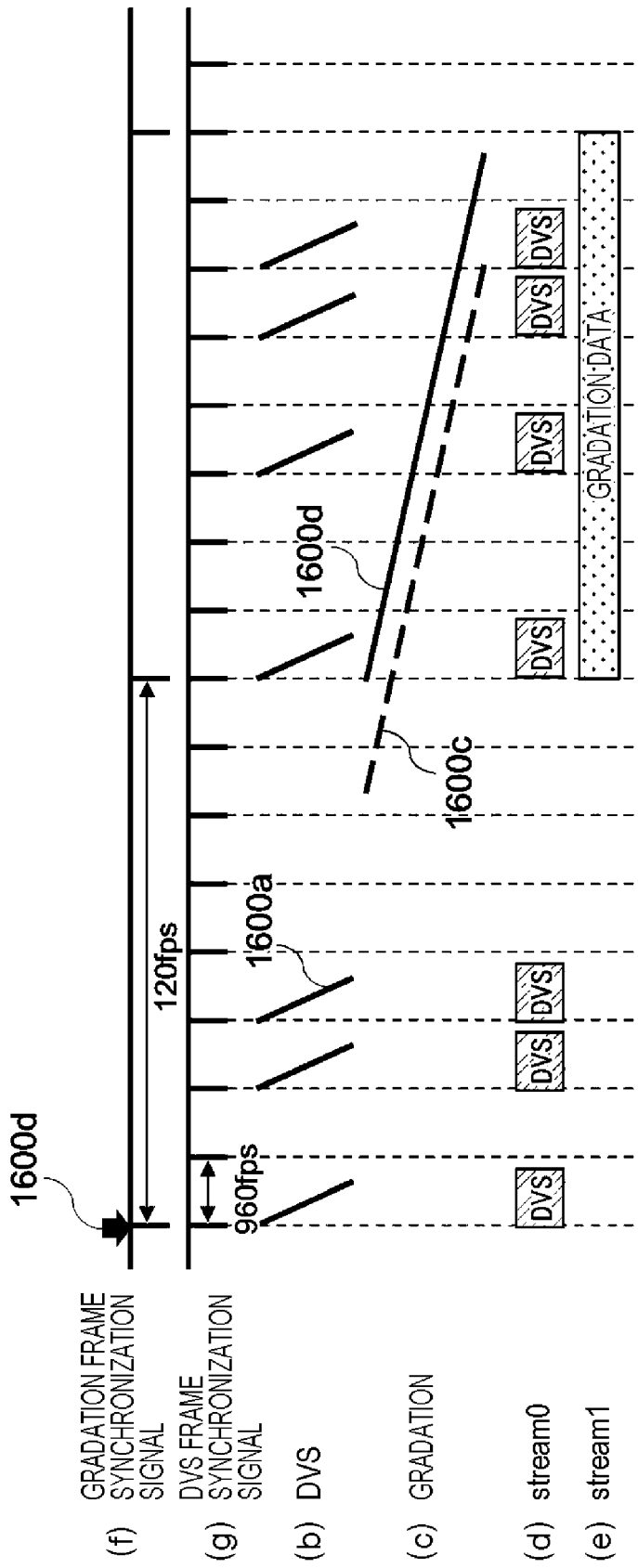
FIG. 19 is a diagram illustrating an imaging control example using a gradation frame synchronization signal.

FIG. 19 is a diagram illustrating an imaging control example according to Modification 2 of the first embodiment using a gradation frame synchronization signal (f). The horizontal axis represents time.

A gradation frame synchronization signal (f) indicates a timing to start reading of the gradation pixel 308a. When there is a request 1600b for image data from the control unit 130 (FIG. 1), the timing control circuit 212d generates a gradation frame synchronization signal corresponding to the exposure time.

A DVS frame synchronization signal (g) indicates a timing to start reading for each frame from the DVS pixel 308b. The timing control circuit 212d generates a DVS frame synchronization signal of 960 (fps) cycles using the gradation frame synchronization signal. In a case where an address event has occurred in any of the DVS pixels 308b, the timing control circuit 212d reads the luminance signal from each of the DVS pixels 308 b in the row order from all the DVS pixels 308b of the frame in which the address event has occurred.

A stream0 (d) indicates a reading time of the DVS pixel 308b. As illustrated in stream0 (d), when an address event occurs in any of the DVS pixels 308b, the timing control circuit 212d reads luminance signals from all the DVS pixels 308b in units of frames. On the other hand, the luminance signal is not read in the frame in which the address event does not occur.

Figure 20:
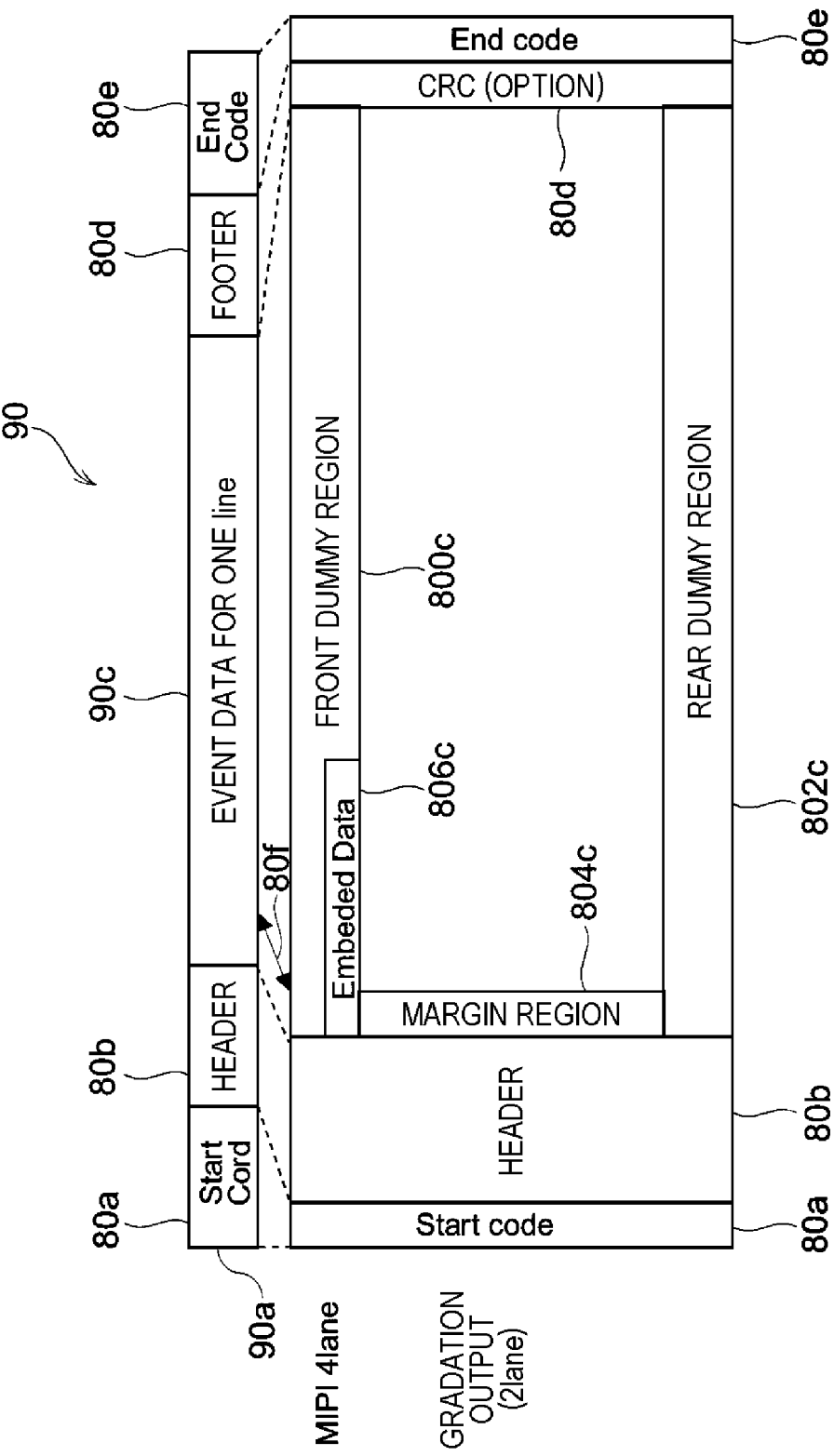
FIG. 20 is a diagram illustrating an example of an image data format of a second DVS image according to Modification 2 of the first embodiment.

FIG. 20 is a diagram illustrating an example of an image data format of a second DVS image generated by the second signal processing unit 214 according to Modification 2 of the first embodiment. As illustrated in FIG. 20, the DVS image data 90 includes a plurality of pieces of line event data 90a. Similarly to the image data illustrated in FIG. 8, the line event data 90a includes a start code 80a, a header 80b, event data 90c for one line, a footer 80d, and an end code 80e. The start code 80a indicates the start of line event data 90a, and the header 80b includes various types of information. In addition, the event data 90c for one line includes digital signals of luminance signals output from the DVS pixels 308b for one line of the pixel array unit 30.

The footer 80d can include various types of information. The end code 80e indicates the end of the line image data 80. 80f schematically illustrates that a plurality of pieces of line event data 90a is arranged in order. Furthermore, the event data 90c for one line includes a front dummy region 800c, a rear dummy region 802c, a margin region 804c, and an embedded data region 806c. Note that the front dummy region 800c, the rear dummy region 802c, and the margin region 804 do not need to be provided. The time stamp may be recorded in the header 80 b and the embedded data region 806c.

As described above, according to Modification 2 of the first embodiment, the luminance signal from the DVS pixel 308b is read in units of frames. Therefore, in addition to the effects described in the first embodiment, it is possible to update the image data in units of frames in which an address event has occurred in the second DVS image. In addition, since the data transfer of only the frame in which the address event has occurred in the second DVS image is performed, the transfer is made more efficient.

(Modification 3 of First Embodiment)

An imaging device 100 according to Modification 3 of the first embodiment is different from the imaging device 100 according to Modification 2 of the first embodiment in that a gradation frame synchronization signal is generated using a DVS frame synchronization signal. Hereinafter, differences from the imaging device 100 according to Modification 2 of the first embodiment will be described.

Figure 21:
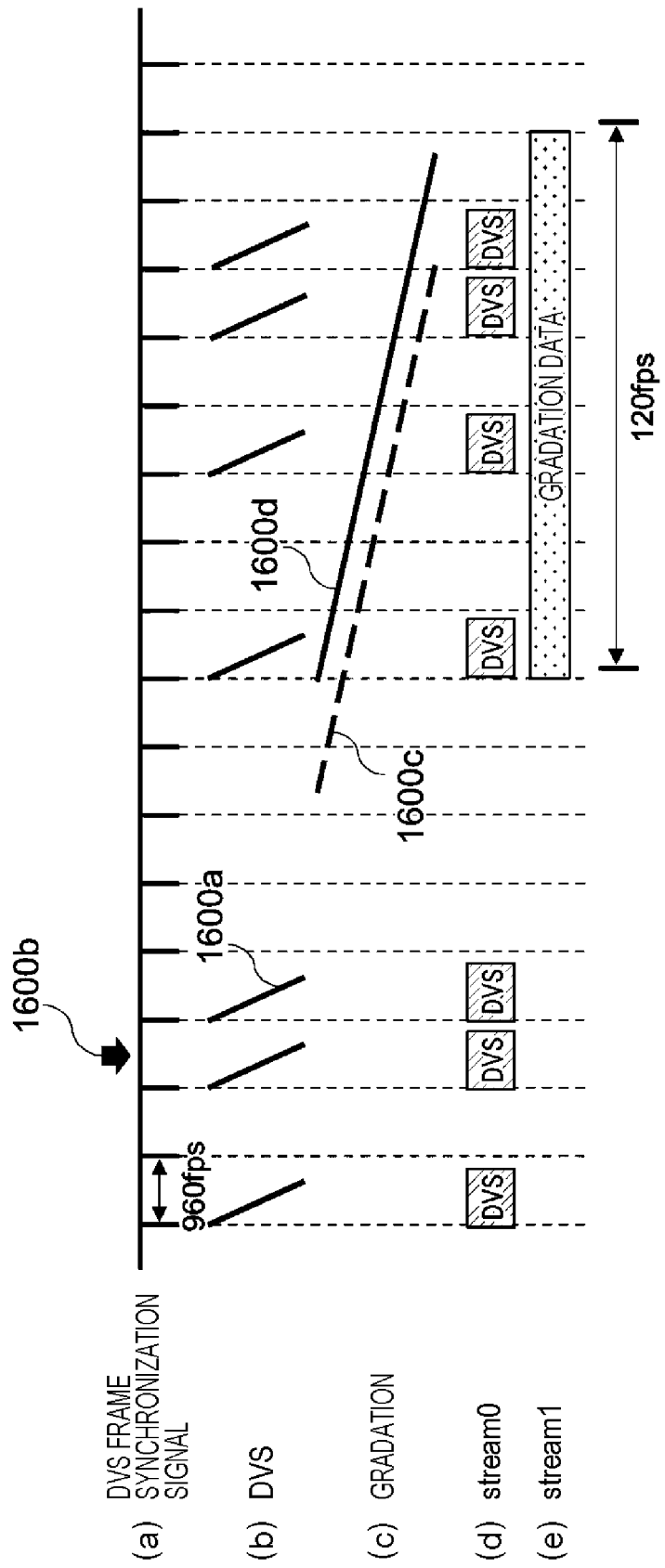
FIG. 21 is a diagram illustrating an imaging control example using a DVS frame synchronization signal.

FIG. 21 is a diagram illustrating an imaging control example according to Modification 3 of the first embodiment using the DVS frame synchronization signal (g). The horizontal axis represents time.

A gradation frame synchronization signal (f) indicates a timing to start reading of the gradation pixel 308a. The timing control circuit 212d generates a gradation frame synchronization signal using the DVS frame synchronization signal (g). The timing control circuit 212d performs processing equivalent to that of the imaging device 100 according to Modification 2 of the first embodiment using the gradation frame synchronization signal (f) and the DVS frame synchronization signal (g). As a result, in addition to the effects described in the first embodiment, it is possible to update the image data in units of frames in which the address event has occurred in the second DVS image. In addition, since the data transfer of only the frame in which the address event has occurred in the second DVS image is performed, the transfer is made more efficient.

Second Embodiment

An imaging device 100 according to the second embodiment is different from the imaging device 100 according to the first embodiment in that a luminance signal is read from the DVS pixel 308b using an arbiter circuit 250. Hereinafter, differences from the imaging device 100 according to the first embodiment will be described.

Figure 22:
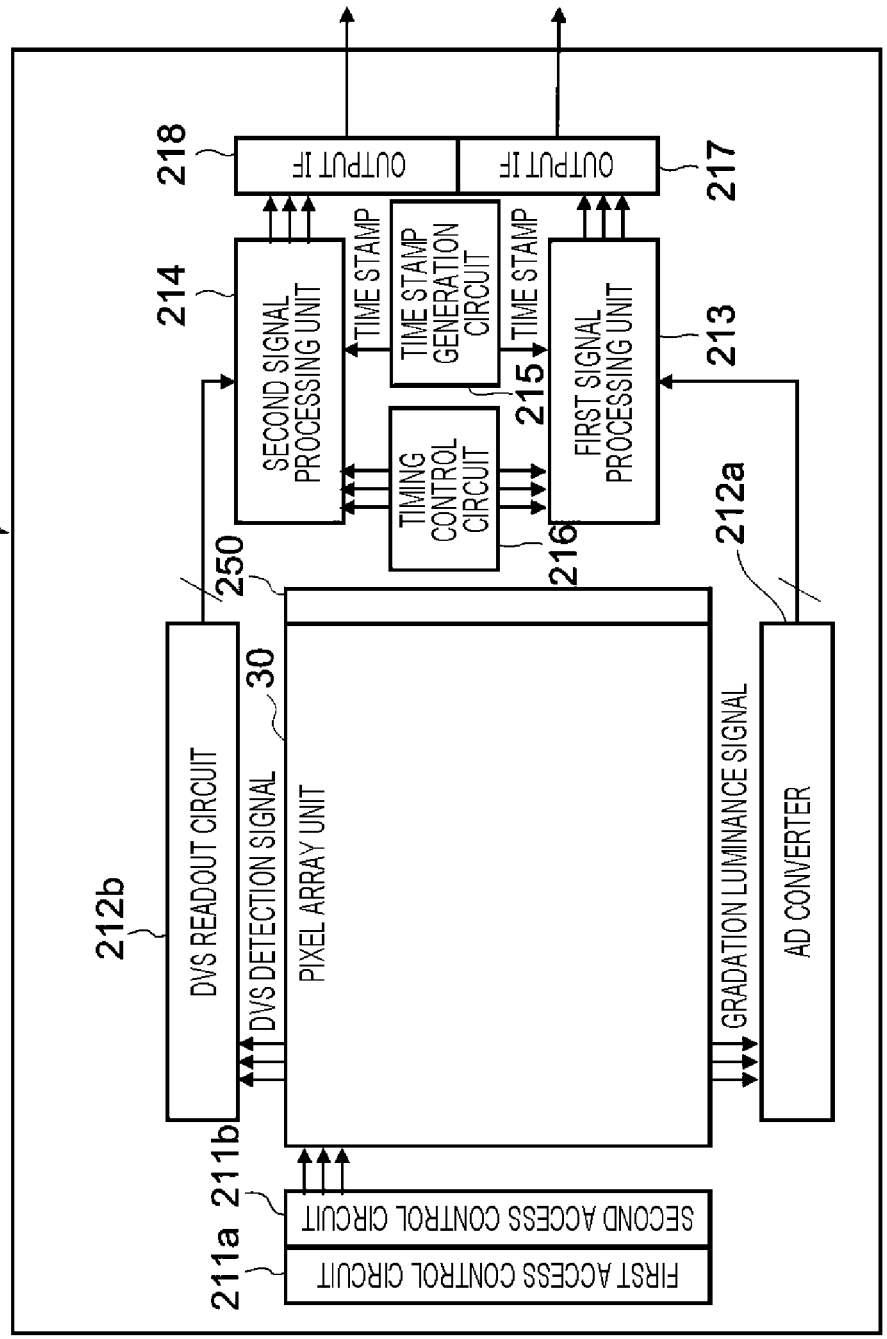
FIG. 22 is a block diagram illustrating a configuration example of a solid-state imaging element 200 according to a second embodiment.

FIG. 22 is a block diagram illustrating a configuration example of a solid-state imaging element 200 according to the second embodiment. As illustrated in FIG. 22, the solid-state imaging element 200 according to the present disclosure includes the arbiter circuit 250.

Figure 23:
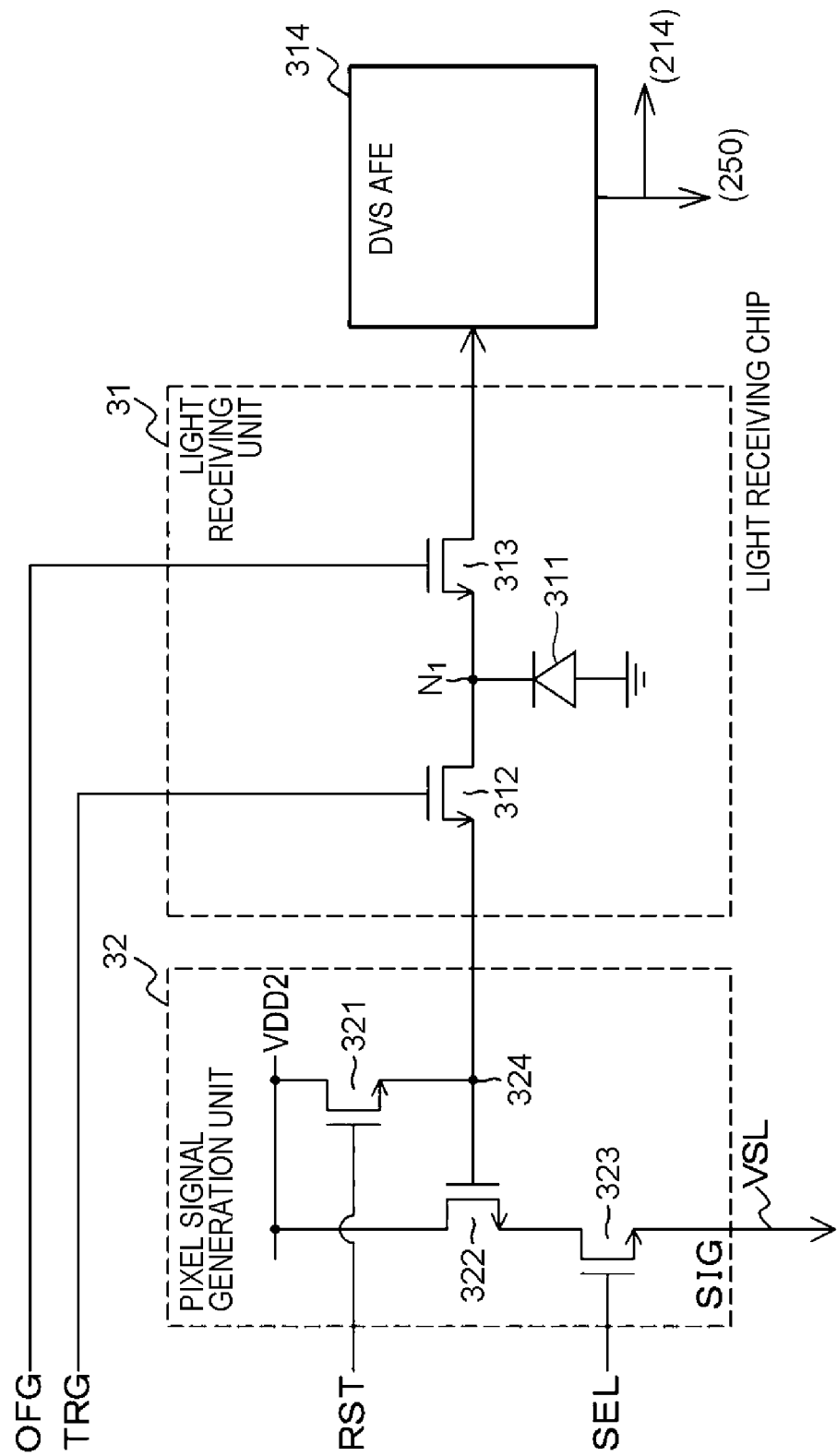
FIG. 23 is a diagram illustrating a configuration example of a dummy DVS pixel according to the second embodiment.

FIG. 23 is a diagram illustrating a configuration example of a DVS pixel 308b according to the second embodiment. Each of the plurality of DVS pixels 308b includes a light receiving unit 31, a pixel signal generation unit 32, and a DVS AFE 314. As illustrated in FIG. 23, the DVS AFE 314 according to the second embodiment outputs a request to the arbiter circuit 250 when an address event occurs.

The arbiter circuit 250 arbitrates a request from each of the plurality of DVS AFEs 314 and transmits a response based on the arbitration result to the DVS AFE 314. Upon receiving the response from the arbiter unit 23, the DVS AFE 314 supplies a detection signal indicating a detection result to the second signal processing unit 214. The second signal processing unit 214 further outputs a detection signal including information indicating the position of the DVS AFE 314 in which the address event has occurred to the second access control circuit 211b and the timing control circuit 212d.

Figure 24:
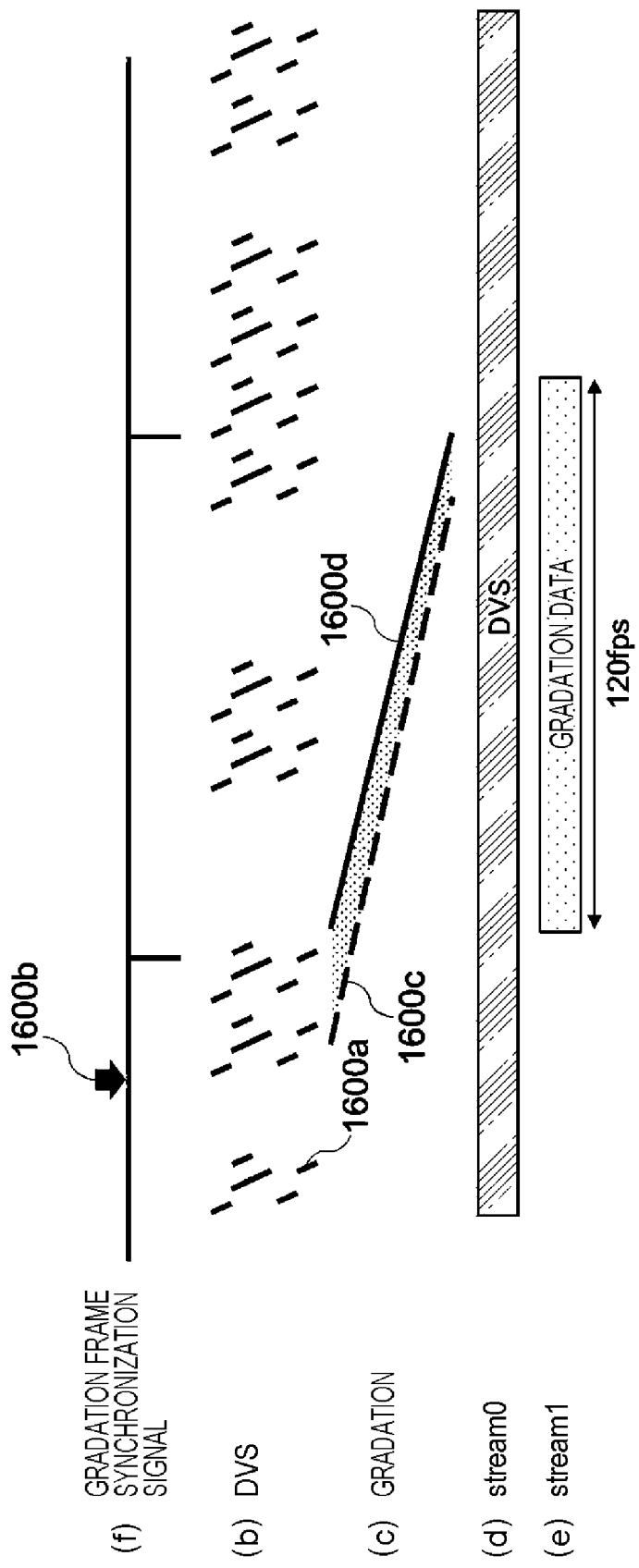
FIG. 24 is a diagram illustrating an imaging control example by a timing control circuit using an arbiter circuit.

FIG. 24 is a diagram illustrating an imaging control example by the timing control circuit 212d using the arbiter circuit 250. The horizontal axis represents time.

A DVS reading (b) indicates a reading position and time of the DVS pixel 308b. The vertical axis corresponds to the row of the pixel array unit 30. The timing control circuit 212d reads the luminance signal from the DVS pixel 308 instructed by the arbiter circuit 250 arbitration via the DVS readout circuit 212b.

Reading of the gradation data (c) indicates a reading position and time from the gradation pixel 308a. The vertical axis corresponds to the row of the pixel array unit 30. When there is a request 1600b for image data from the control unit 130 (FIG. 1), the timing control circuit 212d starts reading from the gradation pixels 308a at a timing coincident with the read start timing of the DVS synchronization signal (a) according to the time stamp. That is, the timing control circuit 212d generates a gradation synchronization signal for starting reading from the gradation pixel 308a using the DVS synchronization signal (a).

Similarly to the data format illustrated in FIG. 9, the second signal processing unit 214 generates a plurality of first packets 90a and a plurality of second packets 90b as the DVS image data 90. As illustrated in FIG. 9, the packets 90a and 90b are generated for each DVS pixel 308b. For example, the first packet 90a has information regarding the DVS pixel 308b in which the event has occurred. On the other hand, the second packet 90b has information regarding the DVS pixel 308b in which no event has occurred.

As described above, according to the present embodiment, the luminance signal is read from the DVS pixel 308b using the arbiter circuit 250. As a result, the reading of the luminance signal from the DVS pixel 308 in which the address event has occurred and the reading of the luminance signal from the gradation pixel 308a can be performed simultaneously, and the generation of the gradation image data and the DVS image data can be made faster.

<Application Example of Technology According to Present Disclosure>

The technology according to the present disclosure can be applied to various products. Hereinafter, a more specific application example will be described. For example, the technology according to the present disclosure may be realized as a distance measuring device mounted on any type of mobile body such as an automobile, an electric vehicle, a hybrid electric vehicle, a motorcycle, a bicycle, a personal mobility, an airplane, a drone, a ship, a robot, a construction machine, and an agricultural machine (tractor).

[Mobile Body]

Figure 25:
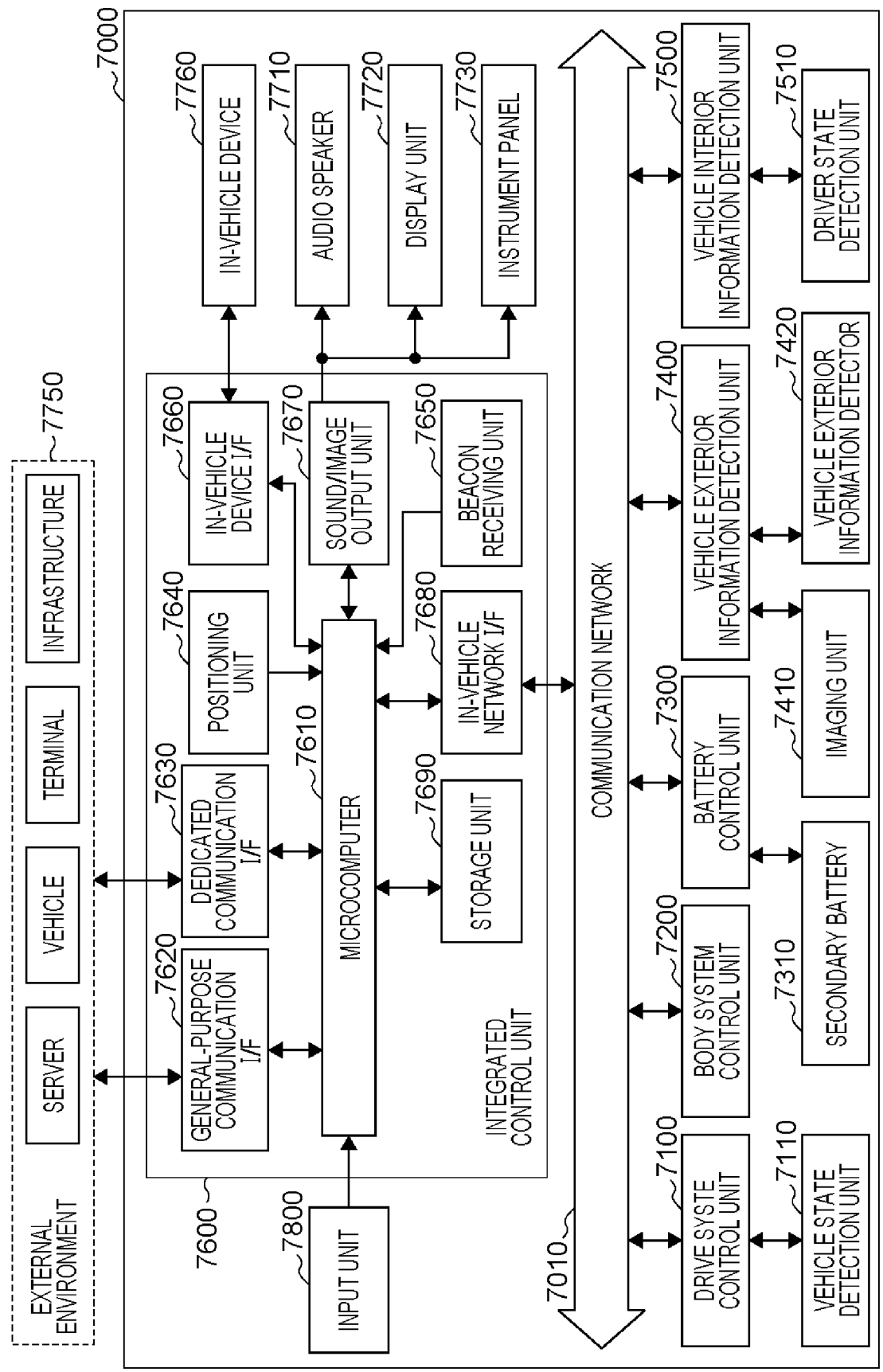
FIG. 25 is a block diagram illustrating a schematic configuration example of a vehicle control system which is an example of a mobile body control system to which the technology according to the present disclosure can be applied.

FIG. 25 is a block diagram illustrating a schematic configuration example of a vehicle control system 7000 which is an example of a mobile body control system to which the technology according to the present disclosure can be applied. The vehicle control system 7000 includes a plurality of electronic control units connected via a communication network 7010. In the example illustrated in FIG. 25, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, or the like, and a drive circuit that drives various devices to be controlled. Each control unit includes a network I/F for communicating with other control units via the communication network 7010, and a communication I/F for communicating with devices, sensors, or the like inside and outside the vehicle by wired communication or wireless communication. In FIG. 27, as a functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, a sound/image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like. The drive system control unit 7100 may have a function as a control device such as an antilock brake system (ABS) or an electronic stability control (ESC).

A vehicle state detection unit 7110 is connected to the drive system control unit 7100. The vehicle state detection unit 7110 includes, for example, at least one of a gyro sensor that detects an angular velocity of axial rotational motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The drive system control unit 7100 performs arithmetic processing using a signal input from the vehicle state detection unit 7110, and controls an internal combustion engine, a driving motor, an electric power steering device, a brake device, or the like.

The body system control unit 7200 controls operations of various devices mounted on the vehicle body according to various programs. For example, the body system control unit 7200 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the driving motor, according to various programs. For example, information such as a battery temperature, a battery output voltage, or a remaining capacity of a battery is input to the battery control unit 7300 from a battery device including the secondary battery 7310. The battery control unit 7300 performs arithmetic processing using these signals, and performs temperature adjustment control of the secondary battery 7310 or control of a cooling device or the like included in the battery device.

The vehicle exterior information detection unit 7400 detects information outside the vehicle on which the vehicle control system 7000 is mounted. For example, at least one of an imaging unit 7410 or a vehicle exterior information detector 7420 is connected to the vehicle exterior information detection unit 7400. The imaging unit 7410 includes at least one of a time of flight (ToF) camera, a stereo camera, a monocular camera, an infrared camera, or other cameras. The vehicle exterior information detector 7420 includes, for example, at least one of an environment sensor for detecting current weather or weather, or a surrounding information detection sensor for detecting another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunshine sensor that detects a degree of sunshine, or a snow sensor that detects snowfall. The surrounding information detection sensor may be at least one of an ultrasonic sensor, a radar device, or a light detection and ranging, laser imaging detection and ranging (LIDAR) device. The imaging unit 7410 and the vehicle exterior information detector 7420 may be provided as independent sensors or devices, or may be provided as a device in which a plurality of sensors or devices is integrated.

Figure 26:
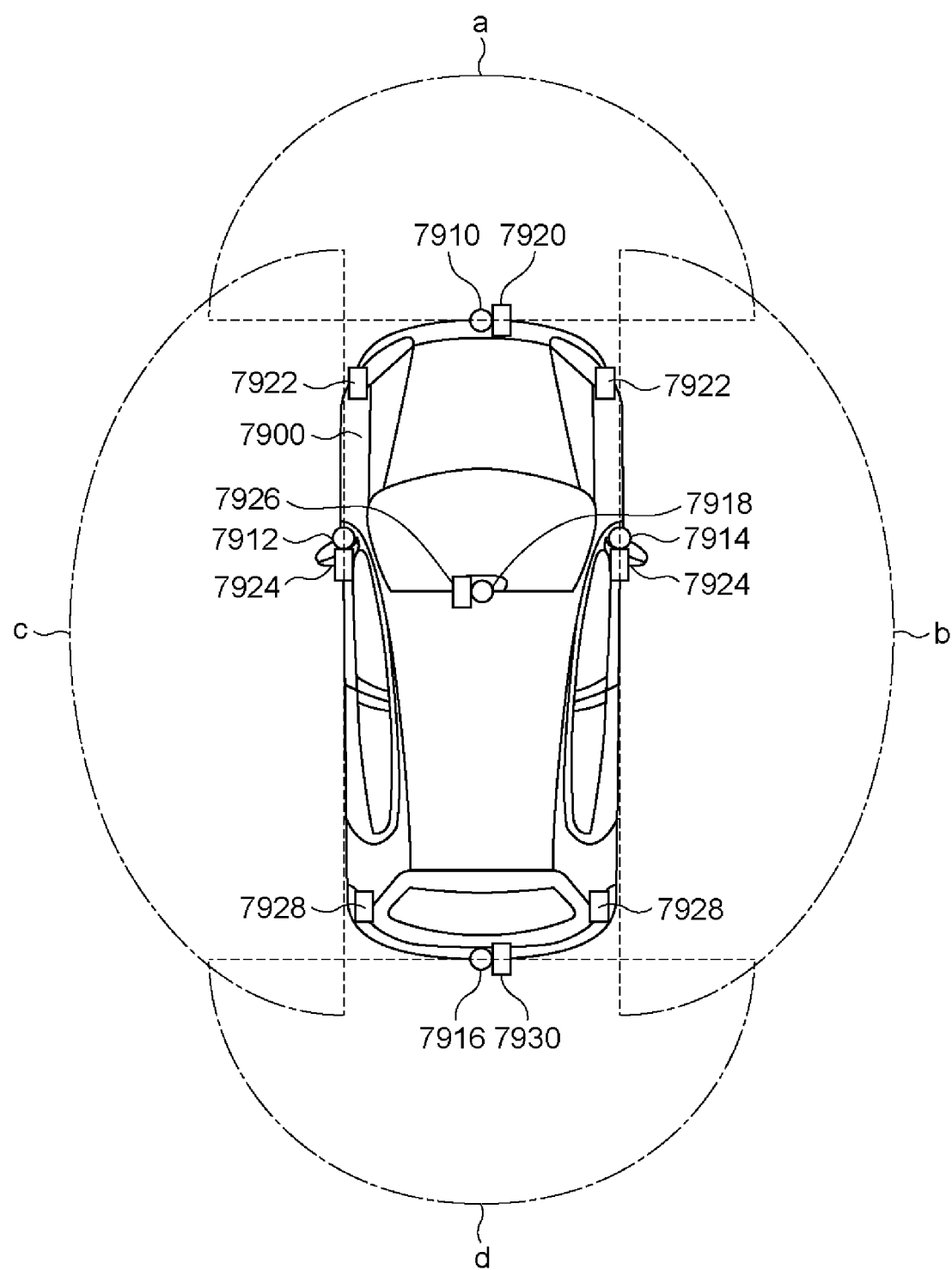
FIG. 26 is a diagram illustrating an example of installation positions of an imaging unit and a vehicle exterior information detector.

Here, FIG. 26 illustrates an example of installation positions of the imaging unit 7410 and the vehicle exterior information detector 7420. The imaging units 7910, 7912, 7914, 7916, and 7918 are provided, for example, at least one of a front nose, a side mirror, a rear bumper, a back door, or an upper portion of a windshield in a vehicle interior of the vehicle 7900. The imaging unit 7910 provided at the front nose and the imaging unit 7918 provided at the upper portion of the windshield in the vehicle interior mainly acquire images in front of the vehicle 7900. The imaging units 7912 and 7914 provided at the side mirrors mainly acquire images of the sides of the vehicle 7900. The imaging unit 7916 provided on the rear bumper or the back door mainly acquires an image behind the vehicle 7900. The imaging unit 7918 provided at the upper portion of the windshield in the vehicle interior is mainly used to detect a preceding vehicle, a pedestrian, an obstacle, a traffic light, a traffic sign, a lane, or the like.

Note that FIG. 26 illustrates an example of imaging ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, respectively, and an imaging range d indicates an imaging range of the imaging unit 7916 provided at the rear bumper or the back door. For example, by superimposing image data captured by the imaging units 7910, 7912, 7914, and 7916, an overhead view image of the vehicle 7900 viewed from above is obtained.

Vehicle exterior information detectors 7920, 7922, 7924, 7926, 7928, and 7930 provided at the front, rear, sides, corners, and the upper portion of the windshield in the vehicle interior of the vehicle 7900 may be ultrasonic sensors or radar devices, for example. The vehicle exterior information detectors 7920, 7926, and 7930 provided at the front nose, the rear bumper, the back door, and the upper portion of the windshield in the vehicle interior of the vehicle 7900 may be, for example, LIDAR devices. These vehicle exterior information detectors 7920 to 7930 are mainly used for detecting a preceding vehicle, a pedestrian, an obstacle, or the like.

Returning to FIG. 25, the description will be continued. The vehicle exterior information detection unit 7400 causes the imaging unit 7410 to capture an image outside the vehicle, and receives the captured image data. Furthermore, the vehicle exterior information detection unit 7400 receives detection information from the connected vehicle exterior information detector 7420. In a case where the vehicle exterior information detector 7420 is an ultrasonic sensor, a radar device, or a LIDAR device, the vehicle exterior information detection unit 7400 transmits ultrasonic waves, electromagnetic waves, or the like, and receives information of received reflected waves. The vehicle exterior information detection unit 7400 may perform object detection processing or distance detection processing of a person, a vehicle, an obstacle, a sign, a character on a road surface, or the like on the basis of the received information. The vehicle exterior information detection unit 7400 may perform environment recognition processing of recognizing rainfall, fog, road surface conditions, or the like on the basis of the received information. The vehicle exterior information detection unit 7400 may calculate a distance to an object outside the vehicle on the basis of the received information.

Furthermore, the vehicle exterior information detection unit 7400 may perform image recognition processing or distance detection processing of recognizing a person, a car, an obstacle, a sign, a character on a road surface, or the like on the basis of the received image data. The vehicle exterior information detection unit 7400 may perform processing such as distortion correction or alignment on the received image data, and combine image data captured by different imaging units 7410 to generate a bird's-eye view image or a panoramic image. The vehicle exterior information detection unit 7400 may perform viewpoint conversion processing using image data captured by different imaging units 7410.

The vehicle interior information detection unit 7500 detects information inside the vehicle. For example, a driver state detection unit 7510 that detects a state of a driver is connected to the vehicle interior information detection unit 7500. The driver state detection unit 7510 may include a camera that images the driver, a biological sensor that detects biological information of the driver, a microphone that collects sound in the vehicle interior, or the like. The biological sensor is provided, for example, on a seat surface, a steering wheel, or the like, and detects biological information of an occupant sitting on a seat or a driver holding the steering wheel. The vehicle interior information detection unit 7500 may calculate the degree of fatigue or the degree of concentration of the driver or may determine whether or not the driver is dozing on the basis of the detection information input from the driver state detection unit 7510. The vehicle interior information detection unit 7500 may perform processing such as noise canceling processing on the collected sound signal.

The integrated control unit 7600 controls the overall operation in the vehicle control system 7000 according to various programs. An input unit 7800 is connected to the integrated control unit 7600. The input unit 7800 is realized by, for example, a device such as a touch panel, a button, a microphone, a switch, or a lever that can be operated by an occupant for input. Data obtained by performing voice recognition on the voice input by the microphone may be input to the integrated control unit 7600. The input unit 7800 may be, for example, a remote control device using infrared rays or other radio waves, or an external connection device such as a mobile phone or a personal digital assistant (PDA) corresponding to the operation of the vehicle control system 7000. The input unit 7800 may be, for example, a camera, and in this case, the passenger can input information by gesture. Alternatively, data obtained by detecting the movement of the wearable device worn by the passenger may be input. Furthermore, the input unit 7800 may include, for example, an input control circuit or the like that generates an input signal on the basis of information input by the occupant or the like using the input unit 7800 and outputs the input signal to the integrated control unit 7600. By operating the input unit 7800, the occupant or the like inputs various data to the vehicle control system 7000 or instructs a processing operation.

The storage unit 7690 may include a read only memory (ROM) that stores various programs to be executed by the microcomputer, and a random access memory (RAM) that stores various parameters, calculation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in the external environment 7750. The general-purpose communication I/F 7620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company-specific network) via, for example, a base station or an access point.

Furthermore, the general-purpose communication I/F 7620 may be connected to a terminal (for example, a terminal of a driver, a pedestrian, or a store, or a machine type communication (MTC) terminal) existing in the vicinity of the vehicle using, for example, a peer to peer (P2P) technology.

The dedicated communication I/F 7630 is a communication I/F that supports a communication protocol formulated for use in a vehicle. For example, the dedicated communication I/F 7630 may implement a standard protocol such as wireless access in vehicle environment (WAVE) which is a combination of IEEE 802.11 p of the lower layer and IEEE 1609 of the upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite), executes positioning, and generates position information including the latitude, longitude, and altitude of the vehicle. Note that the positioning unit 7640 may specify the current position by exchanging signals with a wireless access point, or may acquire the position information from a terminal such as a mobile phone, a PHS, or a smartphone having a positioning function.

The beacon receiving unit 7650 receives, for example, radio waves or electromagnetic waves transmitted from a wireless station or the like installed on a road, and acquires information such as a current position, a traffic jam, a closed road, a required time, or the like. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as wireless LAN, Bluetooth (registered trademark), near field communication (NFC), or wireless USB (WUSB). Furthermore, the in-vehicle device I/F 7660 may establish wired connection such as universal serial bus (USB), high-definition multimedia interface (HDMI) (registered trademark), or mobile high-definition link (MHL) via a connection terminal (and, if necessary, a cable.) not illustrated. The in-vehicle device 7760 may include, for example, at least one of a mobile device or a wearable device possessed by a passenger, or an information device carried in or attached to the vehicle. Furthermore, the in-vehicle device 7760 may include a navigation device that searches for a route to an arbitrary destination. The in-vehicle device I/F 7660 exchanges a control signal or a data signal with these in-vehicle devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information regarding the inside and outside of the vehicle, and output a control command to the drive system control unit 7100. For example, the microcomputer 7610 may perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like. Furthermore, the microcomputer 7610 may perform cooperative control for the purpose of automated driving or the like in which the vehicle autonomously travels without depending on the operation of the driver by controlling the driving force generation device, the steering mechanism, the braking device, or the like on the basis of the acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680, and create local map information including surrounding information of the current position of the vehicle. Furthermore, the microcomputer 7610 may predict danger such as collision of the vehicle, approach of a pedestrian or the like, or entry into a closed road on the basis of the acquired information, and generate a warning signal. The warning signal may be, for example, a signal for generating a warning sound or turning on a warning lamp.

The sound/image output unit 7670 transmits an output signal of at least one of a sound or an image to an output device capable of visually or audibly notifying an occupant of the vehicle or the outside of the vehicle of information. In the example of FIG. 24, an audio speaker 7710, a display unit 7720, and an instrument panel 7730 are illustrated as the output device. The display unit 7720 may include, for example, at least one of an on-board display or a head-up display. The display unit 7720 may have an augmented reality (AR) display function. The output device may be another device other than these devices, such as a wearable device such as a headphone or an eyeglass-type display worn by a passenger, a projector, or a lamp. In a case where the output device is a display device, the display device visually displays results obtained by various processing performed by the microcomputer 7610 or information received from another control unit in various formats such as text, images, tables, and graphs. Furthermore, in a case where the output device is a sound output device, the sound output device converts an audio signal including reproduced sound data, acoustic data, or the like into an analog signal and aurally outputs the analog signal.

Note that, in the example illustrated in FIG. 24, at least two control units connected via the communication network 7010 may be integrated as one control unit. Alternatively, each control unit may include a plurality of control units. Further, the vehicle control system 7000 may include another control unit (not shown). Furthermore, in the above description, some or all of the functions performed by any of the control units may be provided to another control unit. That is, as long as information is transmitted and received via the communication network 7010, predetermined arithmetic processing may be performed by any control unit. Similarly, a sensor or a device connected to any of the control units may be connected to another control unit, and a plurality of control units may mutually transmit and receive detection information via the communication network 7010.

An example of the vehicle control system to which the technology according to the present disclosure can be applied has been described above. The technology according to the present disclosure can be applied to, for example, the imaging units 7910, 7912, 7914, 7916, and 7918, the vehicle exterior information detectors 7920, 7922, 7924, 7926, 7928, and 7930, the driver state detection unit 7510, and the like, among the above-described configurations. Specifically, the imaging system 10 in FIG. 1 including the imaging device of the present disclosure can be applied to these imaging units and detectors. Then, by applying the technology according to the present disclosure, the influence of a noise event such as sensor noise can be mitigated, and the occurrence of a true event can be reliably and quickly sensed, so that safe vehicle traveling can be realized.

Note that, the present technology can also adopt the following configurations.

(1) An imaging device including:
  a pixel array unit including a plurality of DVS pixels that outputs a first luminance signal corresponding to a light amount and a plurality of gradation pixels that outputs a second luminance signal corresponding to the light amount;
  a detection circuit that outputs a detection signal indicating occurrence of an address event in a case where a first luminance signal of each of the plurality of DVS pixels exceeds a predetermined threshold;
  a first reading unit that reads the first luminance signal from the plurality of DVS pixels and converts the first luminance signal into digital data;
  a second reading unit that reads the second luminance signal from the plurality of gradation pixels and converts the second luminance signal into digital data; and
  a control circuit that controls the first reading unit and the second reading unit.

(2) The imaging device according to (1),
  in which the control circuit simultaneously performs reading of the first luminance signal by the first reading unit and reading of the second luminance signal by the second reading unit.

(3) The imaging device according to (1) or (2),
  in which in a case where occurrence of the address event is detected by the detection circuit, the control circuit performs control to read the first luminance signal from the DVS pixel in which the address event is detected.

(4) The imaging device according to any one of (1) to (3), further including a time stamp generation circuit that generates a time stamp,
  in which the control circuit synchronizes reading of the first luminance signal by the first reading unit with reading of the second luminance signal by the second reading unit by the time stamp.

(5) The imaging device according to (4),
in which information of the time stamp is added to DVS image data based on the first luminance signal read out from the first reading unit.
(6) The imaging device according to (5),
in which the time stamp information is added to image data based on a luminance signal read out from the second reading unit.
(7) The imaging device according to any one of (1) to (6),
in which the plurality of DVS pixels is arranged in a two-dimensional array, and output signals from the plurality of DVS pixels are read out according to an arrangement of rows of the array.
(8) The imaging device according to (3),
in which the control circuit synchronizes a reading cycle of the first luminance signal by the first reading unit with a reading cycle of the second luminance signal by the second reading unit.
(9) The imaging device according to (1),
in which the control circuit generates a read synchronization signal of the second luminance signal by the second reading unit on the basis of a read synchronization signal of the first luminance signal by the first reading unit.
(10) The imaging device according to any one of (1) to (9), further including an arbitration circuit that arbitrates reading of luminance signals from the plurality of DVS pixels on the basis of the detection signal,
in which the control circuit reads the first luminance signal by the first reading unit according to arbitration by the arbitration circuit.
(11) The imaging device according to (1),
in which the plurality of DVS pixels is arranged in a two-dimensional array,
the control circuit synchronizes a reading cycle of the first luminance signal by the first reading unit with a reading cycle of the second luminance signal by the second reading unit, and
the first luminance signal of each of the plurality of DVS pixels is read out according to an arrangement of rows of the array.
(12) The imaging device according to (11),
in which the first luminance signal is read out from all of the plurality of DVS pixels in synchronization with a reading cycle of the first luminance signal.
(13) The imaging device according to (11),
in which the control circuit synchronizes a reading cycle of the first luminance signal by the first reading unit with a reading cycle of the second luminance signal by the second reading unit.
(14) The imaging device according to (11),
in which the control circuit generates a read synchronization signal of the second luminance signal by the second reading unit on the basis of a read synchronization signal of the first luminance signal by the first reading unit.
(15) The imaging device according to any one of (1) to (14),
in which a data format of DVS image data based on the first luminance signal is changed according to the number of occurrences of the address event.
(16) The imaging device according to any one of (1) to (15),
in which a region of the plurality of gradation pixels is divided into a plurality of regions, and
the second reading unit reads the second luminance signal for each of the plurality of regions.

(17) A method of controlling an imaging device including: a pixel array unit including a plurality of DVS pixels that outputs a first luminance signal corresponding to a light amount and a plurality of gradation pixels that outputs a second luminance signal corresponding to the light amount; and a detection circuit that outputs a detection signal indicating occurrence of an address event in a case where a first luminance signal of each of the plurality of DVS pixels exceeds a predetermined threshold, the method including:
simultaneously reading the first luminance signal and the second luminance signal according to occurrence of the address event.

Aspects of the present disclosure are not limited to the above-described embodiments, but include various modifications that can be conceived by a person skilled in the art, and the effects of the present disclosure are not limited to the above-described contents. That is, various additions, modifications, and partial deletions can be made without departing from the conceptual idea and gist of the present disclosure derived from the contents defined in the claims and equivalents thereof.

REFERENCE SIGNS LIST

30 Pixel array unit
100 Imaging device
200 Solid-state imaging element
211b Second access control circuit
212a AD converter
212b DVS reading circuit
212c Time stamp generation circuit
212d Timing control circuit
213 First signal processing unit
214 Second signal processing unit
250 Arbiter circuit
308a Gradation pixel
308b DVS pixel
314 DVS AFE

The invention claimed is:
1. An imaging device, comprising:
a pixel array unit that includes:
a plurality of dynamic vision sensor (DVS) pixels and a plurality of gradation pixels arranged in a matrix, wherein
each pixel column of the plurality of DVS pixels is wired via a first signal line and each pixel column of the plurality of gradation pixels is wired via a second signal line; and
the first signal line is independent of the second signal line;
a DVS pixel of the plurality of DVS pixels configured to output a first luminance signal, wherein
the first luminance signal corresponds to a light amount; and
a gradation pixel of the plurality of gradation pixels configured to output a second luminance signal, wherein
the second luminance signal corresponds to the light amount;
a detection circuit configured to output a detection signal that indicates occurrence of an address event for the DVS pixel of the plurality of DVS pixels, wherein the occurrence of the address event is based on the first luminance signal exceeds a specific threshold;
a first reading unit configured to:
read the first luminance signal from the DVS pixel in an event the occurrence of the address event is detected in the DVS pixel, wherein the address event is detected based on the detection signal; and
convert the first luminance signal into first digital data;
a second reading unit configured to:
read the second luminance signal from the gradation pixel; and
convert the second luminance signal into second digital data; and
a control circuit configured to
control the first reading unit and the second reading unit.

2. The imaging device according to claim 1, wherein the control circuit is further configured to;
control the first reading unit to read the first luminous signal; and
control the second reading unit to read the second luminance signal simultaneously with the first luminance signal.

3. The imaging device according to claim 1, further comprising a time stamp generation circuit configured to generate a time stamp, wherein
the control circuit is further configured to control the first reading unit to read the first luminance signal synchronously with the second luminance signal, based on the time stamp, and
the second luminance signal is read by the second reading unit.

4. The imaging device according to claim 3, further comprising a signal processing unit configured to add information of the time stamp to DVS image data based on the first luminance signal.

5. The imaging device according to claim 3, further comprising a signal processing unit configured to add information of the time stamp to gradation image data based on the second luminance signal.

6. The imaging device according to claim 1, wherein
the plurality of DVS pixels is in a two-dimensional array, and
the first reading unit is further configured to read the first luminance signal based on an arrangement of rows of the plurality of DVS pixels in the two-dimensional array.

7. The imaging device according to claim 1,
wherein the control circuit is further configured to synchronize a reading cycle of the first luminance signal with a reading cycle of the second luminance signal.

8. The imaging device according to claim 1, wherein the control circuit is further configured to generate a read synchronization signal of the second luminance signal based on a read synchronization signal of the first luminance signal.

9. The imaging device according to claim 1, further comprising an arbitration circuit configured to:
arbitrate reading process of the first luminance signal from the DVS pixel based on the detection signal,
wherein the control circuit is further configured to control the reading process of the first luminance signal by the first reading unit based on the arbitration.

10. The imaging device according to claim 1, wherein
the plurality of DVS pixels is in a two-dimensional array,
the control circuit is further configured to synchronize a reading cycle of the first luminance signal with a reading cycle of the second luminance signal, and
the first reading unit is further configured to read the first luminance signal of the DVS pixel based on an arrangement of rows of the plurality of DVS pixels in the two-dimensional array.

11. The imaging device according to claim 10, wherein the first reading unit is further configured to read the first luminance signal in synchronization with the reading cycle of the first luminance signal.

12. The imaging device according to claim 10, wherein the control circuit is further configured to generate a read synchronization signal of the second luminance signal based on a read synchronization signal of the first luminance signal.

13. The imaging device according to claim 1, wherein
a data format of DVS image data is based on a number of the occurrence of the address event, and
the DVS image data is based on the first luminance signal.

14. The imaging device according to claim 1, wherein
a first region of the plurality of gradation pixels in the pixel array unit is divided into a plurality of second regions, and
the second reading unit is further configured to read a third luminance signal for a third region of the plurality of second regions.

15. A method of controlling an imaging device, comprising:
outputting, by a dynamic vision sensor (DVS) pixel of a plurality of DVS pixels, a first luminance signal, wherein
the first luminance signal corresponds to a light amount;
outputting, by a gradation pixel of a plurality of gradation pixels, a second luminance signal, wherein
the second luminance signal corresponds to the light amount;
the plurality of DVS pixels and a plurality of gradation pixels are arranged in a matrix,
each pixel column of the plurality of DVS pixels is wired via a first signal line,
each pixel column of the plurality of gradation pixels is wired via a second signal line; and
the first signal line is independent of the second signal line;
outputting, by a detection circuit, a detection signal that indicates occurrence of an address event for the DVS pixel of the plurality of DVS pixels, wherein
the occurrence of the address event is based on the first luminance signal exceeds a specific threshold;
reading, by a first reading unit, the first luminance signal from the DVS pixel in an event the occurrence of the address event is detected in the DVS pixel, wherein
the address event is detected based on the detection signal; and
reading, by a second reading unit, the second luminance signal simultaneously with the first luminance signal.

* * * * *